US012546269B2

(12) United States Patent
Fox-Rabinovitz et al.

(10) Patent No.: US 12,546,269 B2
(45) Date of Patent: Feb. 10, 2026

(54) SYSTEMS AND METHODS OF DETECTING FLUID RELEASE

(71) Applicant: TORC Robotics, Inc., Blacksburg, VA (US)

(72) Inventors: Joseph Fox-Rabinovitz, Blacksburg, VA (US); Walter Grigg, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 327 days.

(21) Appl. No.: 18/345,684

(22) Filed: Jun. 30, 2023

(65) Prior Publication Data

US 2025/0163866 A1 May 22, 2025

(51) Int. Cl.
F02D 41/22 (2006.01)
G01F 23/292 (2006.01)

(52) U.S. Cl.
CPC ......... F02D 41/22 (2013.01); G01F 23/2928 (2013.01); F02D 2041/225 (2013.01); F02D 2200/0625 (2013.01)

(58) Field of Classification Search
CPC ............. F02D 41/22; F02D 2200/0625; F02D 2041/225; G01F 23/2928; G01M 3/38; G01N 21/9072
USPC .............................. 73/40, 49.2, 114.54, 605
See application file for complete search history.

(56) References Cited

U.S. PATENT DOCUMENTS

| 2,750,800 | A | * | 6/1956 | Bancroft et al. ...... G01F 23/266 324/76.71 |
| 6,782,122 | B1 | * | 8/2004 | Kline .................... G01F 23/292 382/142 |
| 9,064,401 | B2 | * | 6/2015 | Grant ........................ F17C 9/00 |
| 9,132,843 | B2 | * | 9/2015 | Otsubo .............. B61L 15/0072 |
| 10,326,980 | B2 | * | 6/2019 | Zakrzewski .......... G06T 15/005 |
| 10,372,996 | B2 | * | 8/2019 | Jain .......................... G06T 7/001 |
| 10,424,076 | B2 | * | 9/2019 | Zakrzewski ........... B64D 37/00 |
| 10,480,986 | B2 | * | 11/2019 | Cipullo ................... G01S 17/10 |
| 10,527,480 | B2 | * | 1/2020 | Cipullo .............. G01B 11/0608 |
| 10,755,442 | B2 | * | 8/2020 | Lu .......................... H04N 23/10 |
| 2004/0166381 | A1 | | 8/2004 | Muramoto |
| 2008/0236275 | A1 | * | 10/2008 | Breed ................... B60R 21/015 73/290 V |
| 2011/0178710 | A1 | | 7/2011 | Pilutti et al. |
| 2013/0017465 | A1 | * | 1/2013 | Harris ............... H01M 8/04302 429/444 |
| 2015/0160057 | A1 | | 6/2015 | Jo |
| 2019/0234328 | A1 | | 8/2019 | Yonekura et al. |
| 2019/0375423 | A1 | | 12/2019 | Dudar |

(Continued)

FOREIGN PATENT DOCUMENTS

| DE | 102018219414 A1 | 5/2020 |
| JP | 2013196033 A | 9/2013 |
| JP | 2024093393 A | 7/2024 |

Primary Examiner — John Fitzgerald
(74) Attorney, Agent, or Firm — Armstrong Teasdale LLP

(57) ABSTRACT

Fluid release detection is provided. A vehicle can determine, via a first sensor, a flow rate of a first fluid, such as a headspace gas, between an environment and a reservoir of the vehicle. The vehicle can receive a fluid consumption rate for a second fluid, such as a hydrocarbon fuel associated with the reservoir. The vehicle can detect, based on the flow rate and the fluid consumption rate, a fluid release of the reservoir. The vehicle can execute an action responsive to the detection of the fluid release.

20 Claims, 11 Drawing Sheets

(56) References Cited

U.S. PATENT DOCUMENTS

| | | |
|---|---|---|
| 2020/0104989 A1 | 4/2020 | Kennedy et al. |
| 2020/0256756 A1 | 8/2020 | Schild |
| 2021/0110712 A1 | 4/2021 | Proux |
| 2022/0307981 A1 | 9/2022 | Kurtoglu et al. |
| 2023/0159182 A1* | 5/2023 | Tepper .................. G01F 23/292 73/432.1 |
| 2024/0272033 A1 | 8/2024 | Paganelli et al. |
| 2025/0002028 A1* | 1/2025 | Fox-Rabinovitz ........................... B60W 50/0225 |
| 2025/0005973 A1* | 1/2025 | Fox-Rabinovitz ........................... G01M 3/3236 |

\* cited by examiner

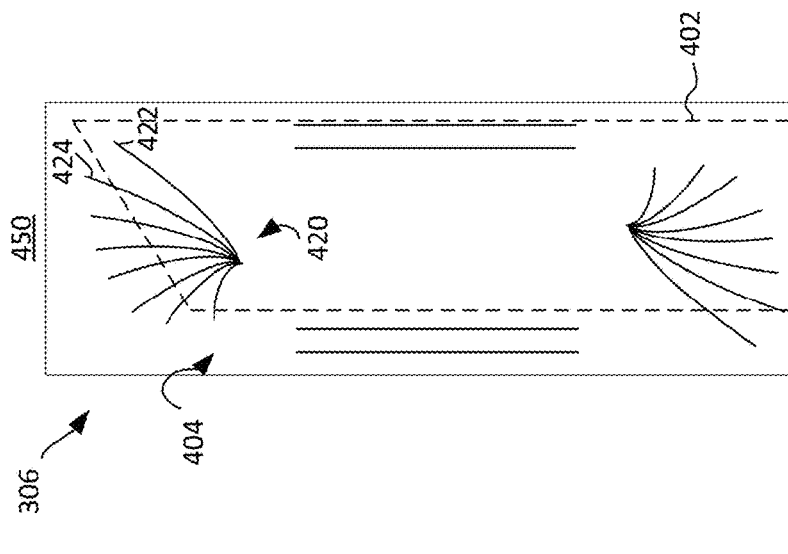
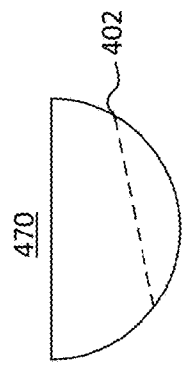
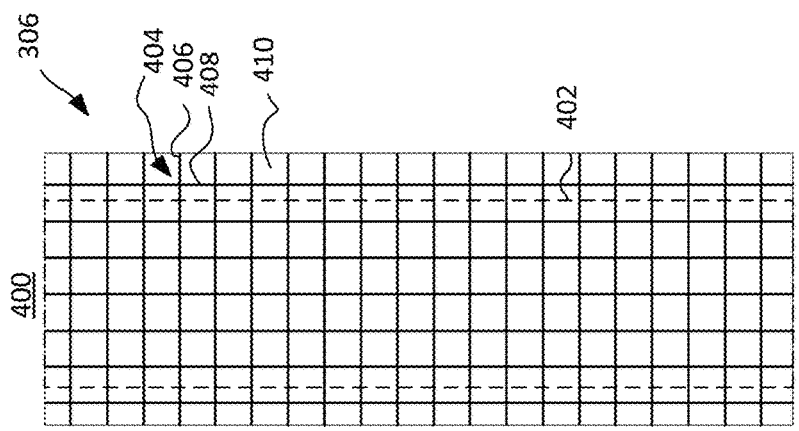
FIG. 4A  FIG. 4B  FIG. 4C  FIG. 4D

SYSTEMS AND METHODS OF DETECTING FLUID RELEASE

TECHNICAL FIELD

The present disclosure relates generally to vehicle control systems and, more specifically, detections of fluid egress.

BACKGROUND

The use of autonomous vehicles has become increasingly prevalent in recent years, with the potential for numerous benefits. However, autonomous vehicles face many of the road hazards faced by human piloted vehicles. For example, road debris or corrosion may interfere with a vehicle, such as by perforating fuel tanks, oil pans, coolant systems, and the like. Human operators may detect such perforations according to a sound, smell, or other indication of the vehicle condition. However, sensors which are present in current autonomy systems, such as forward or rear facing cameras, time of flight sensors, and the like, may not be positioned, specified, or otherwise configured to detect such conditions. Moreover, perforations, un-seated fluidic connectors, or other sources of fluid release can originate from various portions of the vehicle.

SUMMARY

The detection of unplanned releases from vehicle fluid reservoirs can reduce environmental discharge, increase vehicle availability, and increase vehicle reliability. For example, the vehicle can be flagged for service. In some instances, a release may be indicative of an unplanned siding for the vehicle (e.g., due to an impending inoperability of the vehicle, or to avoid discharging fluids over a roadway). Systems and methods of the present disclosure can compare a rate of fluid consumption (e.g., diesel) to a rate of discharge from a fluid reservoir to determine a deviation therebetween or detect a visual indication of fluid loss from a moving vehicle. The vehicle can determine a confidence level for a fluid release based on one or more instances of the systems described herein. For example, a vehicle can include a vision system disposed within a fluid reservoir, a vision system disposed exterior to a fluid reservoir to detect a reflectivity profile of a released fluid, a pressure system to determine a flow rate between a fluid reservoir and an environment, and components of a perception system to determine a presence of road debris corresponding to fluid releases. The vehicle can determine a confidence of a release based on indications from one or more of the vehicle systems.

According to the systems and methods disclosed herein, a vehicle can detect a reflectivity profile of a fluid in a field of view of a sensor. The vehicle can compare the reflectivity profile to one or more predefined reflectivity profiles. For example, the predefined reflectivity profiles can include rain, tire spray of water (e.g., water containing oil or other spillage). In some embodiments, the reflectivity profiles can include vehicle fluids such as brake fluid, oils, engine or battery coolant, or hydrocarbon fuels such as diesel or gasoline. The vehicle can determine a match between a reflectivity profile and a fluid to determine a release of that fluid, or that the fluid is indicative of a benign condition such as rain. As indicated above, the vehicle can determine the fluid release based on further vehicle systems. For example, forward or rearward looking cameras can observe foreign objects or debris (FOD) over a roadway, or an auditory system can detect an indication of a collision between FOD and the vehicle. In some embodiments, the vehicle can impose a time-series or other filter to increase a confidence of a fuel release prior to taking an action.

According to the systems and methods disclosed herein, a vehicle can detect an interior surface of a fluid reservoir such as a fuel tank. For example, a vision system can detect a fluid line separating a headspace from a fluid, or a depth of the fluid. In some embodiments, the fluid line may be detected with known features of a reservoir such as the location of the sensor, or makings integral to or disposed over the interior surface of the reservoir. The vehicle can detect a change in the volume which is greater than a threshold. For example, the threshold can be a single predefined threshold, indicative of a breach of the fuel tank, or can be based on a rate of fluid consumption (e.g., fuel). Based on the rate of change (e.g., a difference between a rate of change of the fluid and a consumption of the fluid), the vehicle can determine a release. Likewise, a pressure system can monitor a flow rate of a headspace gas to determine a change in fluid volume, and determine the breach based on such sensor data.

The systems and methods herein can cause a vehicle to take an action responsive to a fluid release based on a fluid amount, type, vehicle location, and so forth. For example, the systems and methods herein can interface with a vehicle autonomy system to shutoff or reduce loading to an engine, cause the vehicle to exit from a roadway, or flag the vehicle for service.

An embodiment of the present is directed to a vehicle. The vehicle can include one or more processors. The one or more processors can determine, via a first sensor, a flow rate of a first fluid between an environment and a reservoir of the vehicle. The one or more processors can receive a fluid consumption rate for a second fluid associated with the reservoir. The one or more processors can detect, based on the flow rate and the fluid consumption rate, a fluid release of the reservoir. The one or more processors can execute an action responsive to the detection of the fluid release.

Another embodiment of the present disclosure is directed to a method. The method may be performed by one or more processors. The method includes determining a flow rate of a first fluid between an environment and a reservoir via a first sensor. The method includes receiving a fluid consumption rate for a second fluid associated with the reservoir. The method includes detecting a fluid release of the reservoir based on the flow rate and the fluid consumption rate. The method includes executing an action responsive to the detection of the fluid release.

Another embodiment of the present disclosure is directed to a vehicle. The vehicle can include one or more processors. The one or more processors can determine, via a first sensor, a flow rate of a first fluid between an environment and a reservoir. The one or more processors can receive a fluid consumption rate for a second fluid associated with the reservoir. The one or more processors can detect, based on the flow rate and the fluid consumption rate, a fluid release of the reservoir. The one or more processors can execute an action responsive to the detection of the fluid release.

An embodiment of the present is directed to a vehicle. The vehicle can include one or more processors. The one or more processors can receive a first indication of an inner surface of a reservoir associated with a first time. The one or more processors can determine, based on the indication of the inner surface, a first volume of a fluid of the reservoir. The one or more processors can receive a second indication of the inner surface of the reservoir associated with a second time. The one or more processors can determine, based on the second indication of the inner surface, a second volume of the fluid. The one or more processors can determine a rate of change of the fluid based on a first difference between the first time and the second time, and a second difference between the first volume and the second volume. The one or more processors can compare a fluid consumption rate to the rate of change. The one or more processors can detect, based on the rate of change exceeding the fluid consumption rate, a fluid release. The one or more processors can execute an action responsive to the detection of the fluid release.

Another embodiment of the present disclosure is directed to a method. The method may be performed by one or more processors. The method includes receiving a first indication of an inner surface of a reservoir associated with a first time. The method includes determining based on the indication of the inner surface, a first volume of a fluid of the reservoir. The method includes receiving a second indication of the inner surface of the reservoir associated with a second time. The method includes determining based on the second indication of the inner surface, a second volume of the fluid. The method includes determining a rate of change of the fluid based on a first difference between the first time and the second time, and a second difference between the first volume and the second volume. The method includes comparing a fluid consumption rate to the rate of change. The method includes detecting based on the rate of change exceeding the fluid consumption rate, a fluid release. The method includes executing an action responsive to the detection of the fluid release.

Another embodiment of the present disclosure is directed to a system. The system can include one or more processors. The one or more processors can receive a first indication of an inner surface of a reservoir associated with a first time. The one or more processors can determine, based on the indication of the inner surface, a first volume of a fluid of the reservoir. The one or more processors can receive a second indication of the inner surface of the reservoir associated with a second time. The one or more processors can determine, based on the second indication of the inner surface, a second volume of the fluid. The one or more processors can determine a rate of change of the fluid based on a first difference between the first time and the second time, and a second difference between the first volume and the second volume. The one or more processors can compare a fluid consumption rate to the rate of change. The one or more processors can detect, based on the rate of change exceeding the fluid consumption rate, a fluid release. The one or more processors can execute an action responsive to the detection of the fluid release.

An embodiment of the present is directed to a vehicle. The vehicle can include a vision sensor having a field of view comprising a reservoir for a vehicle. The vehicle can include one or more processors. The one or more processors can receive sensor data comprising an indication of a fluid exterior to the reservoir. The one or more processors can determine a reflectivity profile of the fluid exterior to the reservoir. The one or more processors can compare the reflectivity profile of the fluid exterior to the reservoir to a model reflectivity profile of a fluid associated with the reservoir. The one or more processors can detect, based on the comparison to the model reflectivity profile, a fluid release. The one or more processors can execute an action responsive to the detection of the fluid release.

Another embodiment of the present disclosure is directed to a method. The method may be performed by one or more processors. The method includes receiving sensor data comprising an indication of a hydrocarbon fuel exterior to a reservoir. The method includes determining a reflectivity profile of the hydrocarbon fuel exterior to the reservoir. The method includes comparing the reflectivity profile of the hydrocarbon fuel exterior to the reservoir to a model reflectivity profile associated with the hydrocarbon fuel. The method includes detecting a hydrocarbon fuel release based on the comparison to the model reflectivity profile. The method includes executing an action responsive to the detection of the hydrocarbon fuel release.

Another embodiment of the present disclosure is directed to a system. The system includes a vision sensor having a field of view comprising a reservoir. The system can include one or more processors. The one or more processors can receive sensor data comprising an indication of a fluid exterior to the reservoir. The one or more processors can determine a reflectivity profile of the fluid exterior to the reservoir. The one or more processors can compare the reflectivity profile of the fluid exterior to the reservoir to a model reflectivity profile of a fluid associated with the reservoir. The one or more processors can detect, based on the comparison to the model reflectivity profile, a fluid release. The one or more processors can execute an action responsive to the detection of the fluid release.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIGS. 4A, 4B, 4C, and 4D are top cross sectional and side views of fluid reservoirs, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
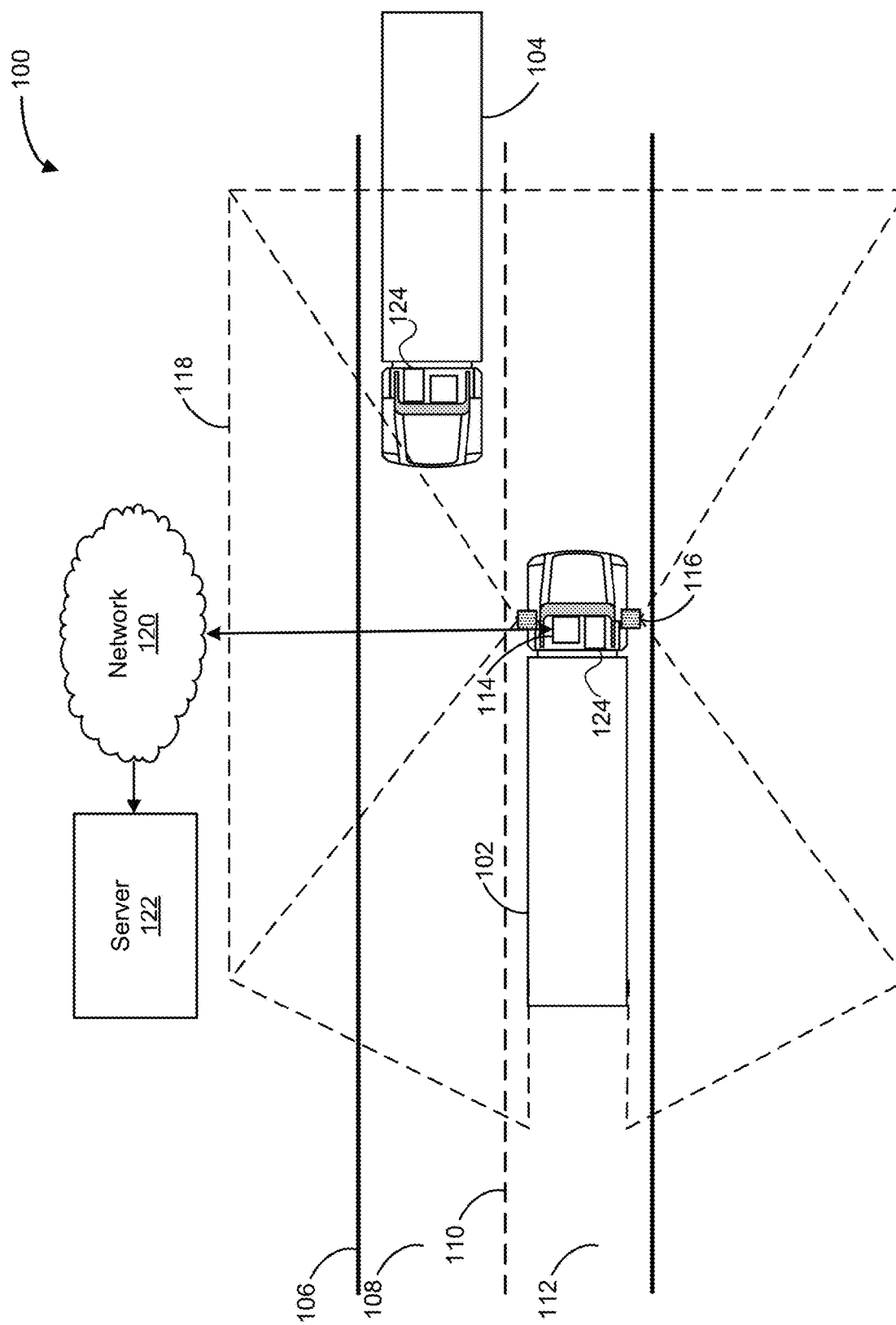
FIG. 1 is a bird's-eye view of a roadway including a schematic representation of a vehicle and aspects of an autonomy system of the vehicle, according to an embodiment.

Referring to FIG. 1, the present disclosure may relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. Embodiments of the present disclosure can be employed with non-autonomous vehicles such as level 1 autonomy vehicles. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly. The perception module 116 may determine a presence of other vehicles, or foreign objects and debris along a roadway, such as spillage from other vehicles from a forward looking camera, or spillage on a roadway, which may not may not be released from the autonomous vehicle 102.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously. The vehicle can convey indications of a status to the remote server 122, such as an indication that the autonomous vehicle 102 has released one or more fluids, or is in a non-operational state. The server can schedule or dispatch a maintenance service to retrieve the vehicle, or schedule the autonomous vehicle 102 for a maintenance operation (e.g., to reseat a fluidic connector associated with a fluid release which is less than a threshold associated with an interruption to operation).

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102, such as to include forward facing a rear facing cameras or time of flight sensors.

Figure 2:
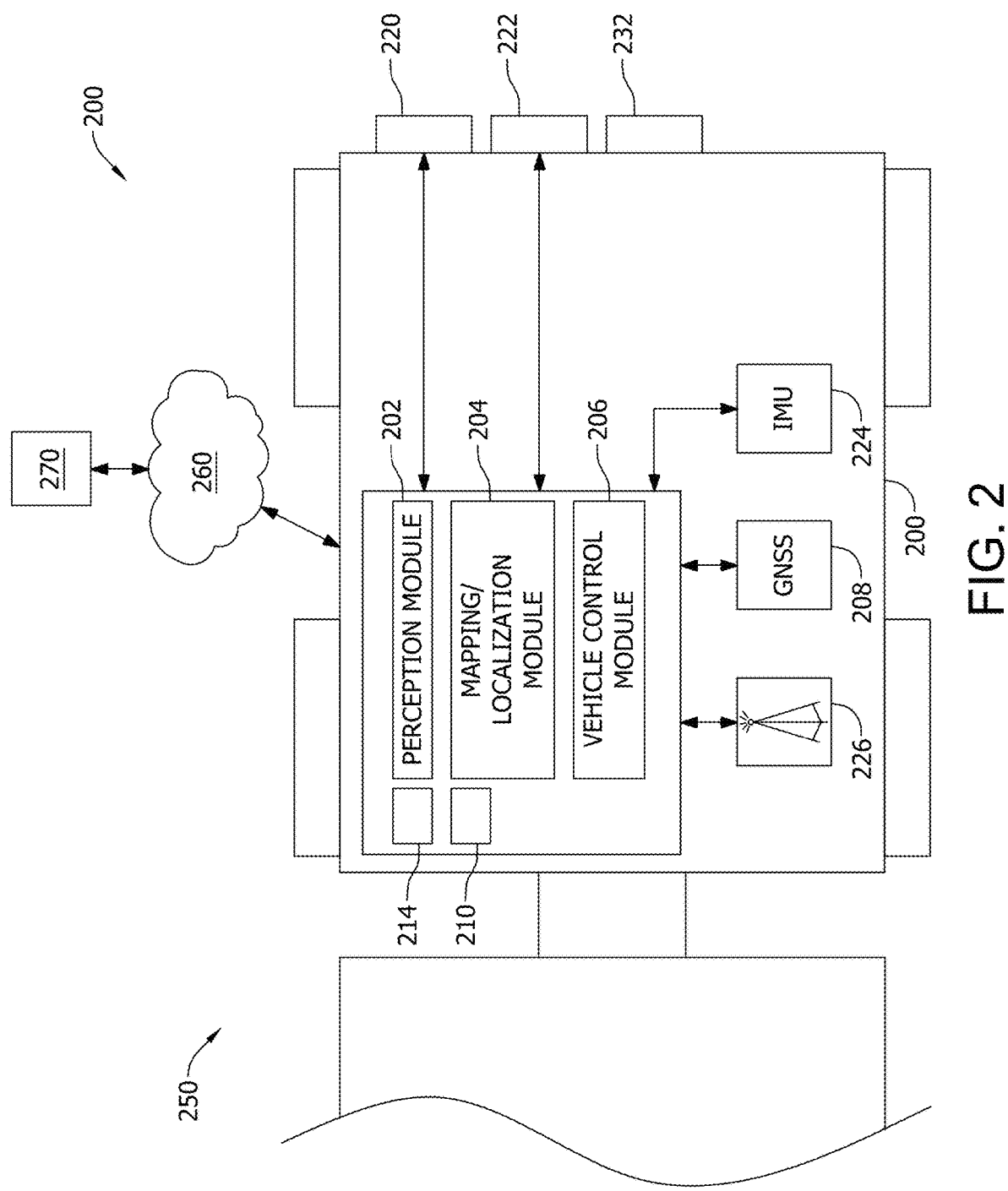
FIG. 2 is a system for determining deviations between observed and expected trajectories of vehicles, according to an embodiment.

FIG. 2 illustrates an example schematic of an autonomy system 250 of a vehicle 200, according to some embodiments. The autonomy system 250 may be the same as or similar to the autonomy system 114 depicted in FIG. 1. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include additional, fewer, or different components or systems, and each of the components or system(s) may include additional, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted. The perception system can include or interface with vision systems or pressure systems described henceforth.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214. Various cameras of the camera system 220 can be disposed within or exterior to one or more fluid reservoirs such as one or more fuel tanks or lines, oil pans, coolant tanks for engines or batteries along with various lines or passageways, etc. The cameras can be configured with a FOV including a fluid within the various fluid reservoir, or otherwise configured to detect a release of fluid from the reservoir (e.g., incident to a puncture).

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems" along with ultrasonics or other time of flight sensors, or the like.

The GNSS receiver 208 may be positioned on the vehicle 200 and may be configured to determine a location of the vehicle 200 via GNSS data, as described herein. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network. The updates can include weather data such as temperature data or pressure data, or the GNSS receiver can be configured to determine a pressure associated with an elevation, such as according to a look-up table or function (e.g., an atmospheric model).

The inertial measurement unit (IMU) 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to switch lanes and monitoring and detecting other vehicles. Numerous commercially available microprocessors can be configured to perform the functions of the autonomy system 250. The processor 210 can include or interface with the various components of, for example, FIG. 13. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

The memory 214 of the autonomy system 250 may store data and/or software routines that may assist the autonomy system 250 in performing autonomy system 250's functions, such as the functions of the perception module 202, the mapping/localization module 204, the vehicle control module 206, and the methods 700, 800, 900, 1000, 1100, and 1200 described herein with respect to FIGS. 7, 8, 9, 10, 11, and 12. Further, the memory 214 may also store data received from various inputs associated with the autonomy system 250, such as perception data from the perception system. Such instructions can be stored, cached, or retrieved from various transitive or non-transitive medium. For example, the processor 210 can retrieve the instructions from a non-transitive media (e.g., NAND or NOR FLASH, magnetic media, or a read only memory) to execute the instructions. Execution of the instructions can include loading the instructions to another memory (e.g., RAM, including volatile or non-volatile RAM) prior to executing other of the instructions.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image or video classification function and/or a computer vision function. In some embodiments, the perception module 202 can include a rain sensor, temperature sensor, of other indications of local environmental conditions.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as time-series data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200.

The control module 206 can receive indications of operation from the one or more systems, and convey such indications to other vehicle 200 subsystems. For example, the control module 206 can provide an indication of fuel use (e.g., a consumption rate for a combustion engine, such as a flow rate of a fuel pump or fuel injector), an amount of oil consumed from an oil pan (e.g., drawn into a top end of engine, prior to return to the oil pan), or an amount of coolant consumed from a coolant reservoir (e.g., drawn into cylinder heads, battery packs, or so forth, prior to a return to the coolant reservoir).

The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

Figure 3:
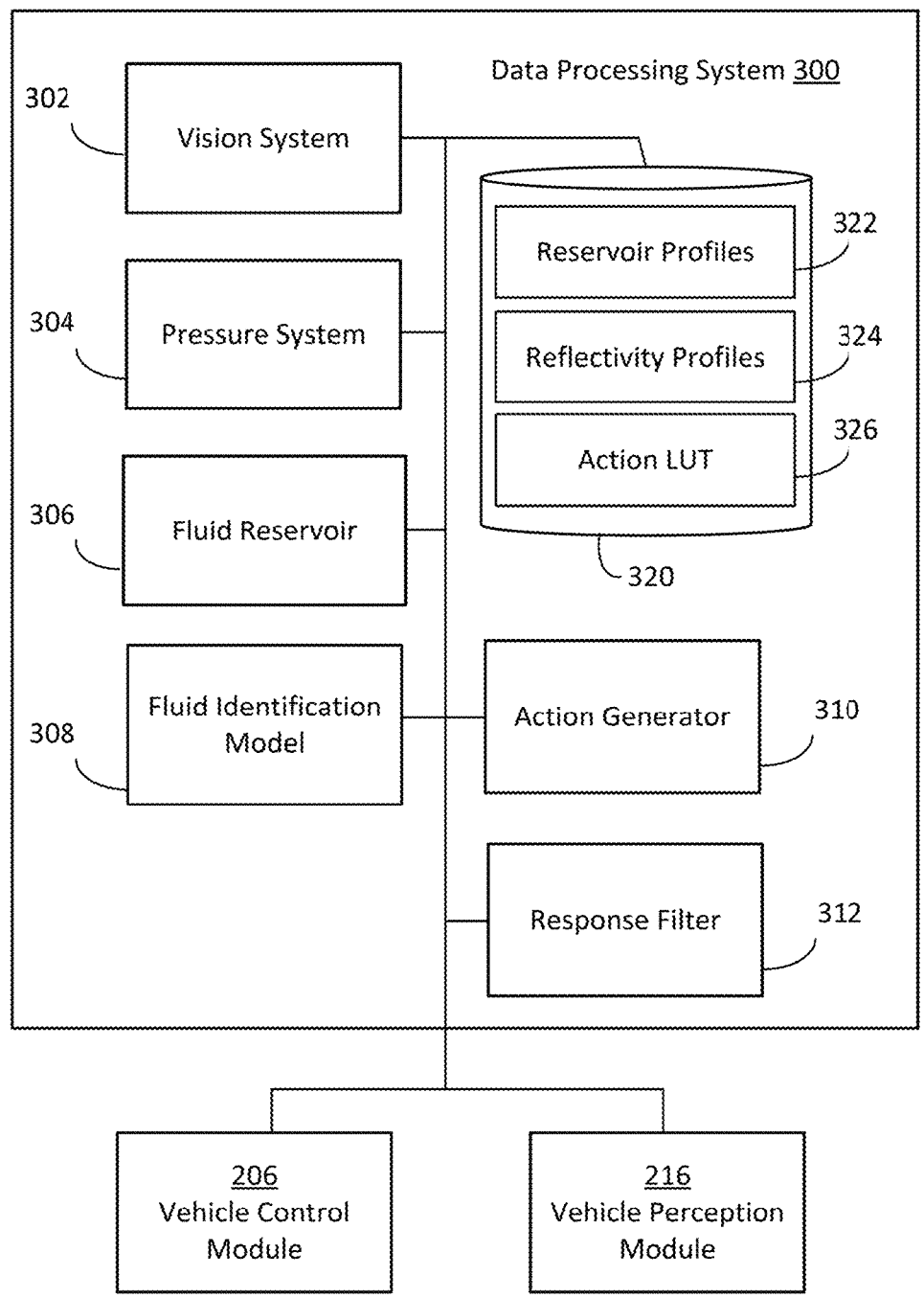
FIG. 3 is a block diagram for a data processing system, according to an embodiment.

Referring now to FIG. 3, the present disclosure relates to a data processing system 300 to detect fluid releases from vehicles, such as autonomous vehicles. In some embodiments, the data processing system 300 includes, interfaces with, is a component of, is hosted by, or otherwise integrates with an autonomous vehicle 102. For example, the data processing system 300 can be integrated into an autonomous vehicle 102 to control the operation of said autonomous vehicle 102, or can be disposed separately therefrom to control the operation of one or more autonomous vehicles 102 connected thereto. The data processing system 300 can exchange information with other components of the autonomous vehicle 102. For example, the data processing system 300 can receive fluid consumption information from the vehicle control module 206, or indications of environmental conditions or debris on a roadway from the vehicle perception module 216.

The data processing system 300 can include or otherwise interface with at least one vision system 302, pressure system 304, fluid reservoir 306, fluid identification model 308, action generator 310, or response filter 312, each of which may each include at least one processing unit or other logic device such as a programmable logic array engine, or module configured to communicate with the data repository 320 or database. The vision system 302, pressure system 304, fluid reservoir 306, fluid identification model 308, action generator 310, or response filter 312 can be separate components, a single component, or part of the autonomous vehicle 102, and can include or interface with, or be components of, a vehicle perception module 216 for one or more autonomous vehicles 102. The data processing system 300 can include hardware elements, such as one or more processors, logic devices, or circuits. For example, the data processing system 300 can include one or more components or structures of functionality of computing devices depicted in FIG. 11. The various components of the data processing system 300 can be in network communication via a controller area network (CAN), Ethernet, or any number of other wired or wireless networks.

The data repository 320 can include one or more local or distributed databases, and can include a database management system. The data repository 320 can include computer data storage or memory and can store one or more data structures, such as a reservoir profile 322, reflectivity profile 324, or action look up table (LUT) 326.

A reservoir profile 322 may include or refer to a predefined volume or geometry of a fluid reservoir 306. For example, the reservoir profile 322 can include a volume-height relationship (e.g., a look-up table, function, or the like). A reservoir profile 322 can include any markings associated with a reservoir, such as a gridline, vertical level lines, or the like. Such markings can be associated with various fluid volumes according to the reservoir profile 322. For example, an interior of a fuel tank can include markings indicative of a volume. Such markings can extend laterally parallel to a driving surface or perpendicular thereto. A reservoir profile 322 can include a position of a marking along a curved surface such that a portion of a visible marking can be employed to determine a volume of fluid in the reservoir. In various embodiments, the reservoir profile 322 can include pressure or temperature information. For example, a fluid reservoir 306 for brake fluid or oil may be under pressure, or a volume thereof may vary with temperature; a fuel tank volume may vary over changes to atmospheric pressure or temperature, and so forth.

A reflectivity profile 324 may include or refer to a predefined profile indicative of one or more fluids. For example, a reflectivity profile 324 for diesel fuel can vary from a reflectivity profile 324 for water. A reflectivity profile 324 can be determined based on a beam of energy (e.g., electromagnetic energy), such as light, radar, or ultrasound, directed towards a fluid. The energy can interact with the fluid's surface and internal structures. The reflected energy, or echo, is then captured and analyzed to determine various properties of the fluid. Diesel fuel, for example, can have a higher reflectivity due to its higher density and viscosity compared to water.

Reflectivity profiles 324 can also aid in distinguishing between different droplet sizes within a fluid. The droplet size may be indicative of a type of release from the autonomous vehicle 102, or to discriminate between a release of a fluid by an autonomous vehicle 102, and ambient fluids which may be present on a roadway, and sprayed into the air by vehicle tires or pressure waves. A reflectivity profile 324 can vary according to droplet size. For example, smaller droplets may tend to scatter energy in multiple directions, resulting in a lower overall reflectivity profile 324. Conversely, larger droplets may reflect more energy back towards the source, yielding a higher reflectivity. Particulars of a reflectivity profile 324 can vary based on fluid type, condition, volume, along with environmental conditions, contaminants and so forth. A Reflectivity profile 324 can vary according to a fluid classifier. For example, a fluid classifier can operate in two dimensions (e.g., an X-Y dimension of an image), three dimensions (e.g., an X-Y-t) dimension of video, or N dimensions (e.g., a color, reflectivity, polarization, linear flow, or further dimensions of various phase spaces). A model reflectivity profile 324 can refer to a stored profile associated with a fluid.

An action LUT 326 may include or refer to a data structure associating an action with a detection of one or more fluids. The action LUT 326 can include actions associated with a fluid type, release amount, vehicle location, or vehicle speed. For example, the action LUT 326 can associate a loss of brake fluid with an engagement of hazard warning lights, immediately coming to a halt via application of a mechanical brake system, or increasing a following distance such that the vehicle can come to a halt based on a mechanical brake at a first available turnout. The action LUT 326 can associate loss of fuel with exiting a roadway at a first available turnout. The action LUT 326 can associated a loss of coolant with an engine shutoff, and the autonomous vehicle exiting the roadway. The action LUT 326 can include thresholds for a quantity or confidence of a fuel release (e.g., a particular action may not be taken for confidences of less than 60%, or fuel releases of less than 1 liter per minute). An action LUT 326 data structure can include various actions according to a vehicle, operator, location, or so forth. An update to an action LUT 326 can be received remotely, via the server 122 of FIG. 1. The action LUT 326 can include gradients, functions, or other associations between actions and fluid releases. For example, the action LUT 326 can include a first function to determine an action associated with a fuel release, a second function to determine an action for a brake fluid release, and so forth. The action LUT 326 can be accessible by or otherwise communicatively coupled with the action generator 310.

The vision system 302 can visually detect fluid position associated with a fluid release of a fluid reservoir 306 of an autonomous vehicle 102. The vision system 302 can include or interface with a sensor-emitter pair. For example, one or more sensor-emitter pairs or portions can be disposed within the fluid reservoir 306, or exterior to the fluid reservoir 306 having a line of sight (LOS) or field of view (FOV) including the reservoir 306, or otherwise configured to capture fluid released from the reservoir. The vision system 302 can include various sensors such as visible spectrum or infrared cameras, LiDAR, radar, multispectral cameras (e.g., operating at a multiple discreet wavelengths), hyperspectral camera (e.g., operating over range of continuous wavelength broader than the visible spectrum), or so forth. The various sensors can detect emissions from one or more emitters such as emitters of the vision system 302 or ambient sources (e.g., solar radiation, roadway lighting, or so forth.), as reflected by a fluid in or released from a corresponding reservoir.

In some embodiments, the vision system 302 includes sensors disposed within a fluid reservoir 306 to detect a fluid level of the reservoir. The fluid level may be detected relative to a predefined reservoir profile 322, including a distance between the sensor and the fluid level, one or more structural features of the fluid reservoir 306, or markings over an interior surface thereof. Markings can include level lines, patterns, or points. Markings can differ in reflectivity relative to the surface of the tank (or each other) for one or more wavelengths. For example, markings can be more or less reflective than other portions of an interior surface of a fluid reservoir 306. The vision system 302 can determine a volume of fluid in the reservoir based on a fluid level at one or more points along the interior of the fluid reservoir 306, such as to determine a volume of fluid for an autonomous vehicle 102 disposed along an inclined surface or undergoing acceleration. The vision system 302 can determine the fluid level based on one or more points along the interior of the fluid reservoir 306, along with acceleration data received from the inertial measurement unit (IMU) 224 or fluid consumption information received from the vehicle control module 206.

The vision system 302 can determine a volume of fluid based on a time average. For example, an average fluid level can be determined over an interval (e.g., about 5 seconds, about 10 seconds, etc.). The interval may vary according to a speed of the autonomous vehicle 102 (e.g., a detection interval can increase at high speeds relative to a stopped or slow vehicle). In some embodiments, the vision system 302 vary the interval according to information received from the inertial measurement unit (IMU) 224. For example, a measurement interval for a bumpy road can be greater than for a smooth road surface. Illustrative embodiments of vision systems 302 disposed within fluid reservoirs 306 are depicted and described with regard to, for example, FIG. 4 and FIG. 5.

In some embodiments, a vision system 302 disposed exterior to a fluid reservoir 306 can detect or identify a fluid release from a fluid reservoir 306. For example, the vision system 302 can have a field of view including a fluid reservoir 306. In some embodiments, the vision system 302 can be otherwise relevant to the fluid reservoir 306 (e.g., immediately behind the fluid reservoir 306, such that a fluid released from a fluid reservoir 306 enters a field of view of the vision system 302 when the autonomous vehicle 102 is traveling forward). The vision system 302 can detect a fluid reservoir 306 associated with a fluid release, a fluid type, a fluid quantity, other information relevant to a fluid release. For example, the vision system 302 can discriminate between a left and right fuel tank. An Illustrative embodiment of a vision system 302 disposed exterior to a fluid reservoir 306 is depicted and described with regard to, for example, FIG. 6.

The pressure system 304 can detect fluid position based on a pressures or headspace gas flow rates associated with a fluid release of a fluid reservoir 306. The pressure system 304 can include or interface with a vent between a fluid reservoir 306 and an ambient environment. The fluid reservoir 306 may be at a same or different pressure relative to the ambient environment. The pressure system 304 can detect a pressure of the fluid reservoir 306, or a flow rate for a headspace gas exchanged between the fluid reservoir 306 and an ambient environment. Based on the flow rate, the pressure system 304 can determine a loss of fuel (e.g., based on an amount of air entering the fluid reservoir 306). In some instances, a fluid reservoir 306 may receive a puncture, corrosive pitting, or other breach above a fluid level (e.g., in a headspace). The breach may not cause an immediate fluid release. However, the pressure system 304 can determine a presence of such a breach based on comparison of a pressure or flow rate of a vent of the fluid reservoir 306 with a consumption of the fluid indicated by the vehicle control module 206.

In an illustrative example, the pressure system 304 may receive an indication of a diesel consumption rate of about 0.8 liters from an engine, and receive an indication of in inflow of about 0.2 liters per minute from a fuel tank vent. The pressure system 304 can further receive temperature, elevation, or other environmental information from the vehicle perception module 216. The pressure system 304 can compare an expected inflow of air (e.g., 0.25 liters) to replace the outflow of fuel, compare the difference between the expected inflow and the detected airflow to a threshold (e.g., +/−20%), and determine, based on the comparison, that the fuel tank has been breached. An illustrative embodiment of a pressure system 304 for a fluid reservoir 306 is depicted and described with regard to, for example, FIG. 5.

The at least one fluid reservoir 306 can retain a fluid of an autonomous vehicle 102, such as a hydrocarbon fuel of diesel or gasoline, engine or battery coolant, various lubricants, and so forth. The fluid reservoir 306 can isolate the fluid from environmental conditions and selectively distribute the fluid various components of the autonomous vehicle 102. The fluid reservoir 306 can include one or more mass flow sensors, pressure sensors, vision systems 302, pressure systems 304, inlets, exhausts, vents, and the like. An interior surface of a fluid reservoir 306 can include various markings which can reflect light differently from other portions of the reservoir, or a fluid in the reservoir (e.g., may be more or less reflective), such that a sensor can observe a boundary between a visible portion of a marking and a portion of the marking obscured by the fluid. For example, an inner surface of a fluid reservoir 306 for diesel fuel can be or include steel, aluminum, fiberglass reinforced plastic, or high density polyethylene. A marking can include fuel resistant epoxy coatings, paints, tapes or decals, or ridges of the body of the fluid reservoir 306. The marking can reflect a different amount of light relative to the steel, aluminum, etc. in at least one frequency spectrum (e.g., may be a different color for use with a visible spectrum camera, a different reflectivity for use with an IR camera, or so forth).

The fluid identification model 308 can classify, quantify, or otherwise identify a fluid released from a reservoir. For example, the fluid identification model 308 can identify a fluid type, flow rate, or source. The fluid identification model 308 can include a vision based model which may be based on a reflectivity profile 324 associated with the released fluid, and may further distinguish between road-borne contaminants such as oil, rainwater, and the like from fluid releases from an autonomous vehicle 102. The fluid identification model 308 can include a classification model configured to receive input from a vision system 302.

In some embodiments, the classification model can include a convolutional neural network (CNN) to identify a fluid from one or more individual video frames, or a time-aware model to identify a fluid from a video feed. For example, the classification model can include a C3D (Convolutional 3D) networks to classify a fluid (or lack thereof) with one or more predefined reflectivity profiles 324 for determining the type and size of fluid released from a truck. The C3D can ingest spatial and temporal information from the video to gather insights into the behavior of fluids over time. The C3D model cab extract spatial features from each frame and incorporate the temporal dimension to capture dynamic changes within the profile (e.g., a direction of flow). The C3D model can recognize patterns and features that are not indicative of fuel, such as rain based on normal operation. The model can discern variations in reflectivity caused by distinct fluids, such as water, gasoline, or oil. The model can identify the varying sizes of droplets or particles within these fluids.

In some embodiments, the classification model can include a recurrent neural network (RNN) such as a long short-term memory (LSTM) or gated recurrent unit (GRU) to classify the type or size of fluid released from the autonomous vehicle 102 according to various predefined reflectivity profiles 324. The time-aware models may better distinguish tire spray or rain from a fluid release according to an optical flow model. In some embodiments, a two dimensional model may be employed which may reduce device complexity or energy use. In various embodiments, an ensemble of models can be employed, such as according to a voting arbitration system, cascade model, or so forth.

The fluid identification model 308, can receive indications relevant to a classification from a perception module 116 of an autonomous vehicle 102. For example, the perception module 116 can visually detect foreign objects or debris (FOD) in a roadway, or a sound associated with an impact between the autonomous vehicle 102 and the FOD. Such indications may increase a confidence of a fluid release. For example, the fluid identification model 308 can adjust a weight based on a predefined offset, or by ingesting the indication of the FOD into a machine learning model to predict a classification of a fluid. The perception module 116 can visually detect a presence of rainfall, or a fluid on a road. A forward facing sensor can detect a presence of the fluid on the road, and a rear facing sensor can detect the same fluid, which may be indicative of a lack of fluid release, or lower a confidence of a fluid release. A forward facing sensor can detect an absence of the fluid on the road, and a rear facing sensor can detect a presence of fluid, which may be indicative of a fluid release, or increase a confidence of a fluid release. In various embodiments, the perception module 116 can interface with any of the fluid identification model 308, vision system 302, pressure system 304, or an ensemble or other combination thereof.

The at least one action generator 310 can generate an action responsive to a detection of a fluid release. The action generator 310 can receive information from the fluid identification model 308, vision system 302, or pressure, system 304, or a combination thereof. The action generator 310 can access the action LUT 326, execute functions or look-ups, and generate action in coordination with other systems of the autonomous vehicle 102. For example, the action can be taken in coordination with the autonomy system 114 or via the transceiver 226, such as wherein the action comprises a conveyance of an indication of the fluid release (e.g., to schedule a service or retrieval of the vehicle), or to convey another action of the vehicle, such as an unscheduled roadside stop.

The action generated by the action generator 310 can be or include a navigational or non-navigational action. A navigational action may include to a change in speed or direction. For example, the change in speed can include bringing the autonomous vehicle 102 to a halt, or slowing the autonomous vehicle 102. The change in direction can include navigating the autonomous vehicle 102 to a rightmost lane, a siding, offramp, hard or soft shoulder, breakdown lane, parking location, service location, or the like. The action generator 310 can provide an explicit instruction to the autonomous system, such as an indication to immediately apply brakes. The action generator 310 can provide an indication of a priority of an action to the autonomy system 114, such that the autonomy system can bring the autonomous vehicle 102 to a halt or other zero energy condition. For example, the autonomy system 114 can thereafter reduce speed, exit a roadway, etc. based on a presence of further vehicles, road conditions, the priority, and the like. In a first illustrative example, responsive to a receipt of a first priority condition, the autonomy system 114 can cause the autonomous vehicle to exit a roadway at a first off-ramp and halt the autonomous vehicle 102; responsive to a receipt of a second priority condition, the autonomy system 114 can immediately stop the autonomous vehicle 102 on a soft shoulder of the road.

A non-navigational action may include a transmission to a server 122 such as the remote server 270. For example, the transmission can convey an indication of the autonomous vehicle 102 condition including the indication of the fluid release, the fluid type, quantity, location, reservoir, traffic conditions, or other information. The transmission can provide information regarding the fluid release, or solicit responses such as confirming an event or an action. The non-navigational action can include conveyance of data collection associated with a time of the event, for ingestion by as model of the remote server 270, to train the model to classify fluid release events. For example, at a time subsequent to a first action the fluid release can be confirmed or refuted, and the machine learning model can receive the information, along with the confirmation or refutation of the event, which may improve a prediction quality such as to avoid false positives, or increase a detection efficiency.

The response filter 312 can prune outliers, smooth detection rates, or otherwise filter data received by the vision system 302 or the pressure system 304. The response filter 312 can include a time-series filter to provide a continuous indication over a predefined time (e.g., 3 second, 5 seconds, or the like), or a predefined number of measurements (e.g., 3 sequential measurements, 4 of 5 sequential measurements, or the like). The response filter 312 can filter response according to a fusion of data from one or more systems. For example, the response filter 312 can include an arbitration, voting, or other system to determine a presence of a fuel release based on a combination of a detection or a detection confidence from one or more instances of a vision system 302 or pressure system 304. Thus, noise or spurious measurements can be suppressed, such that an action is not taken in response thereto. In some embodiments, spurious measurements can be logged and employed to increase future detections (e.g., reduce false positives or false negative detection events). In some embodiments, the vision system 302, the pressure system 304, or the action generator 310 can include one or more components of the response filter 312.

Referring to FIG. 4A a top cross-sectional view 400 of a fluid reservoir 306 (e.g., a fuel tank) is depicted. A corresponding profile view 430 of the fluid reservoir 306 is provided at FIG. 4B. A profile of the fluid reservoir 306 can vary along a length or other dimensional thereof. A fluid level line 402 corresponds to an interface between a fluid of the reservoir 306 and a headspace gas. For example, the fluid level line 402 can indicate a boundary between air and diesel fuel. In some embodiments, a fluid reservoir 306 can omit markings; the vision system 302 can determine a volume based on the fluid level line 402, such as by edge detection of the fluid-headspace boundary. In some embodiments, the markings can include folds, creases, outlets, inlets, floats, or other portions of the fluid reservoir 306. Although depicted as transparent, the fluid may be opaque or semitransparent. For example, light can pass through a portion of the fluid, and scatter upon reflection, such that at least a portion of the markings disposed below the fluid level line 402 can reflect light indicative of a depth of the fluid such that the vision system 302 can determine a fluid level line 402 based on either of markings disposed above or below the fluid level line 402.

The depicted fluid reservoir 306 includes markings configured to reflect light differently than the interior surface of the fluid reservoir 306. The depicted reservoir markings 404 include a grid of horizontal markings 406 and vertical markings 408. As depicted, the grid is regular as viewed from above. In some embodiments, the grid can be regular with regard to a lateral distance along the tank. For example, a grid may appear, from above, more dense at some portions (e.g., portions of the tank extending upward such as the depicted first 414, second 416, and third 418 chamfered portions extending from the substantially horizontal base 412). In some embodiments, the grid can be regular with regard to volume. For example, a vertical feature along the second chamfered portion 416 can be spaced closer together than along the first chamfered portion 414.

Referring to FIG. 4C another top cross-sectional view 450 of a fluid reservoir 306 (e.g., a fuel tank) is depicted. A corresponding profile view 470 of the fluid reservoir 306 is provided at FIG. 4D. The indicated fluid level line 402 may be indicative of an acceleration or disposition of the autonomous vehicle 102. According to the systems and methods herein, a vision system 302 can determine a fluid level line 402 based on asymmetrics within the fluid reservoir 306. The depicted markings 404 include vertical markings 408 and spiral or other curved patterns 420. As depicted, the curved pattern 420 can include a first point 422 disposed below the fluid level line 402 and a second point 424 (along with further points) extending above the fluid level line 402. The vision system 302 can determine a number or sequence of points or other marking portions extending above the fluid level line 402, or a distance of one or more points of other portions extending above the fluid level line 402, and determine a volume based thereupon (e.g., according to a corresponding reservoir profile 322). For example, the vision system 302 can include a reservoir profile 322 including a lookup table corresponding to a number or position of visible points, or can include a three-dimensional model of the fluid reservoir 306 to determine a volume based on a fluid level line 402.

Figure 5:
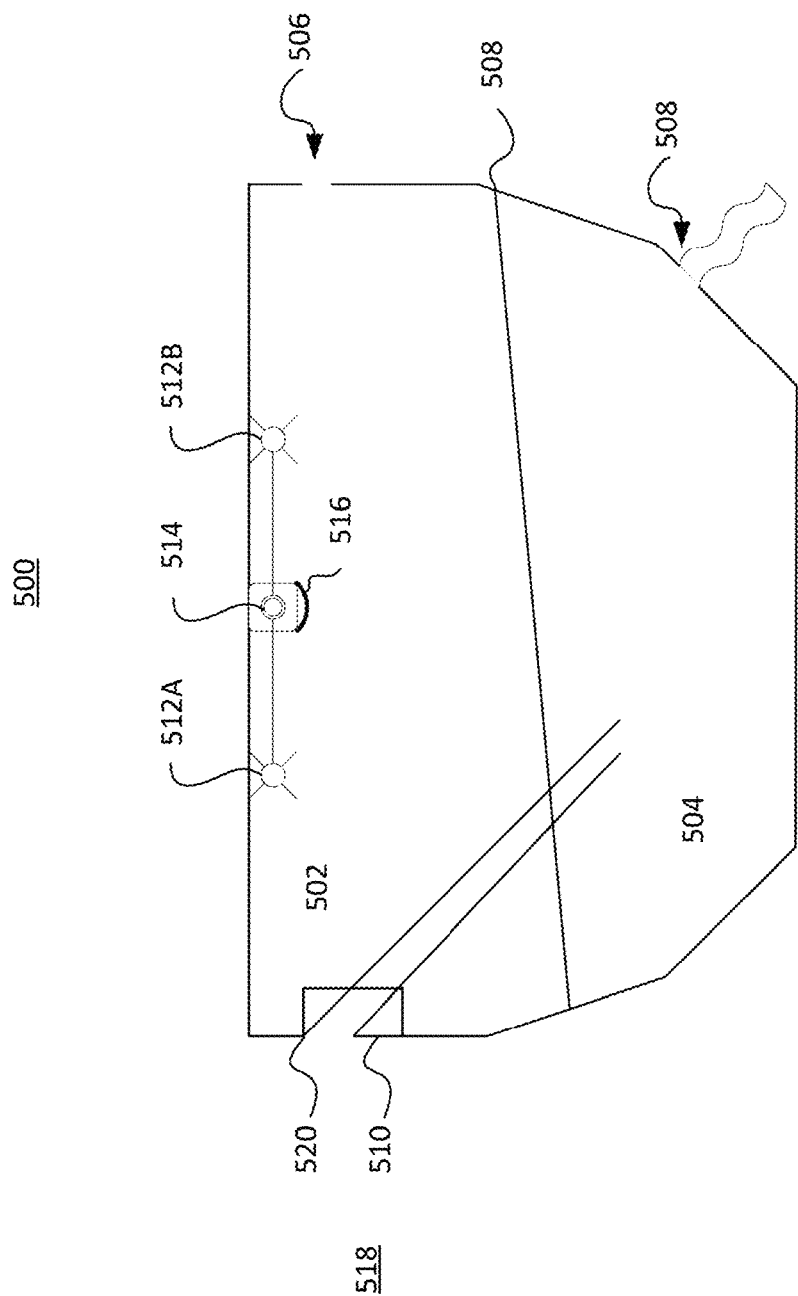
FIG. 5 is a cross sectional view of a fuel tank including components of a vision system and a pressure system, according to an embodiment.

Referring now to FIG. 5, a cross sectional view of a fuel tank 500 is provided, the fuel tank 500 including components of a vision system 302 and a pressure system 304. In various embodiments of the present disclosure, the fuel tank 500 can be substituted for another fluid reservoir 306. In various embodiments, an autonomous vehicle 102 can include various fluid reservoirs 306, such as a left and right side fuel tank 500, whereupon one or more fuel tanks 500 can include components of the vision system 302. A fluid level line 402 intermediates a headspace 502 of the fuel tank 500 from diesel fuel 504. A first breach 506, in the headspace 502 of the fuel tank 500 is present, along with a second breach 508, below the fluid level line 402. As depicted, the fuel can exit the fuel tank 500 from the second breach 508 and not the first breach 506. In various fluid reservoirs 306, a fluid can egress through either of a headspace breach or a breach below a fluid level line 402. For example, steam, vapor, entrained fluids, sloshing fluids, or the like, can be released from a fluid reservoir 306 according to a fluid type, temperature, pressure, and so forth.

A vision system 302 includes a sensor 514 of the vision system 302 such as a camera, radar, LiDAR, ultrasonic, or other time of flight sensor. The sensor 514 can detect a return of an emission from an emitter 512. One or more emitters 512 can be located within the fuel tank 500 or otherwise configured to emit into the fuel tank (e.g., via a sight glass). The first 512A and second 512B emitters can emit a same or different signal (e.g., a color, intensity, phase, frequency, or the like). The depicted first emitter 512A and second emitter 512B are positioned for spatial diversity within the fuel tank 500. In some embodiments, a the first emitter 512A can be a first type of emitter (e.g., to determine a fluid level line 402) along a boundary of the fuel 504 and the headspace 502, and the second emitter 512B can be configured to determine an intensity of a reflection from a marker under the fluid level line 402 (e.g., determine depth based on scattering or attenuation of one or more frequencies, or one or more signal carriers).

The sensor 514 can include an oleo-phobic layer 516 (e.g., lens or coating therefor) to intermediate the sensor 514 from the fuel 504 or other reservoir fluid. The oleo-phobic layer 516 may further be hydro-phobic. In various embodiments, the oleo-phobic layer can include fluoropolymer coatings, silicon-based coatings, silicon-based coatings, polyurethane coatings, zinc-oxide coatings, or diamond-like carbon coatings, combinations of (e.g., nanocomposite coatings), or the like.

A sensor 510 of the pressure system 304 can detect an exchange of airflow between the fuel tank 500 and an ambient environment 518. For example, the sensor 510 can include a mass air flow sensor 510 to determine a mass of air which is conveyed between the ambient environment 518 and the fuel tank 500. The sensor 510 can include a differential pressure sensor (e.g., DP flow meter) such as an orifice plate flow meter. The pressure system 304 can compare a flow rate of air entering a fuel tank 500 over time to determine a fluid release or other breach. In some embodiments, the pressure system 304 can compare a predetermined flow threshold to a flow rate. For example, a threshold flow rate of 10 liters per minute, or another value that exceeds an expected fuel use, can be compared to a measured flow rate. In some embodiments, the pressure system 304 can receive an indication of fuel use. For example, the vehicle control module 206 can provide a fuel flow rate of the engine, or the pressure system 304 can estimate a fuel usage based on an acceleration, inclination, etc. of the autonomous vehicle 102. The pressure system 304 can determine a volume associated with a fuel flow rate according to a type or temperature of fuel, and a corresponding volume associated with an air flow rate based on an ambient temperature, pressure or elevation, and so forth. For example, the pressure system 304 can receive temperature or elevation data for an ambient environment from a vehicle perception module 216 and temperatures, pressure, or flow rates of other systems from the vehicle control module 206.

The pressure system 304 can detect fuel releases based on a current or prior measurement of a flow rate. For example, the pressure system 304 can filter either of the determined flow rates, or the fluid consumption received from the vehicle control module 206.

In an illustrative example, the first breach 506 is formed along the fuel tank 500 and the second breach 508 is absent. The first breach 506 may be formed abruptly, such as from a puncture from roadway debris, or gradually, such as from corrosion, wheel rub, or the like. As indicated above, the breach can correspond to a detection of spillage or FOD from other vehicle systems. In some embodiments, the pressure system 304 can receive an indication of an impact according to a pressure or airflow profile. For example, upon impacting FOD, the pressure system 304 can detect an increase in pressure or air flow from the vent of a tank (e.g., as an impact compresses the volume of the tank). The increase in pressure or air flow may be followed by a larger magnitude of a decrease in pressure or air flow as fuel 504 is released from the fuel tank 500 via the breach.

The breach may not lead to a fuel release, however, the presence of the breach may be relevant to vehicle operation. The fuel 504 can exit from a petcock or other outlet to a fuel system of the engine, which can vary according to an incline, weight, throttle position, gear, vehicle condition or type, and so forth. The consumed fuel may be based on total fuel consumption, or a portion from the fluid reservoir 306 (e.g., about half of fuel can be consumed from each of two fuel tanks 500, or fuel can be preferentially received from one of multiple fuel tanks 500). The consumed fuel can refer to any of a total fuel consumption, maximum fuel for the fuel tanks 500, average fuel consumption from the fuel tanks 500, or so forth. For example, the engine can consume fuel at a rate of about 1 liter per minute, which can all be consumed from the depicted fuel tank 500.

A time average of fuel exiting the fuel tank 500 may be similar to the rate of fuel loss absent a breech. However, in the event of the breach (or another breach in a fuel system, such as at a fuel pump, fuel injector, or so forth) the fuel exiting the fuel tank 500 may be greater, such as about 2, about 20, or 200 liters per minute. Upon the fuel exiting the fuel tank 500, the fuel tank 500 may decrease in pressure as to form a vacuum, which may be detectable by a sensor 510 of the pressure system 304. The fuel tank 500 can include a vent 520 (e.g., a vent 520 interfacing with the sensor 510). The vent 520 can receive air from an ambient environment to replace the fuel 504. The sensor can determine a flow rate of such air. A flow rate of air into the tank associated with a volume less than a fuel flow volume from the fuel tank 500 may be associated with the first breach. A flow rate of air into the tank greater than the fuel flow volume from the fuel tank 500 may be associated with a fuel leak inside of or outside of the fuel tank 500. In some embodiments, the pressure system 304 can receive further information from fuel pumps, injectors, or so forth to determine a location of a fuel leak. Likewise, the systems and methods herein can receive indications of flow rates for various fluids at various points of fluidic circuits (e.g., fuel, oil, coolant, refrigerant, etc.) and determine a point (e.g., portion of the fluidic circuit) of release of fluid from the fluidic circuit.

Referring now to the second breach, a rate of fuel loss may be indicative of a leak below a fluid level line 402. For example, a rate of fuel loss which exceeds an amount of fuel which can exit a fuel tank 500 through a gravity feed or a pump can be indicative of a breach of the fuel tank 500 (e.g., the second breach). In various embodiments, the systems and methods of the present disclosure can distinguish between fuel loss in a fluid reservoir 306 and elsewhere in the fuel system by the pump, injector, or other data indicated above. In various embodiments, the systems and methods of the present disclosure can determine a fluid release location based on a combination of information such as the various vision systems 302, pressure systems 304, and vehicle perception modules 216. In some embodiments, the action LUT 326 can include actions which are applicable to various fuel release locations or may be common therebetween.

Figure 6:
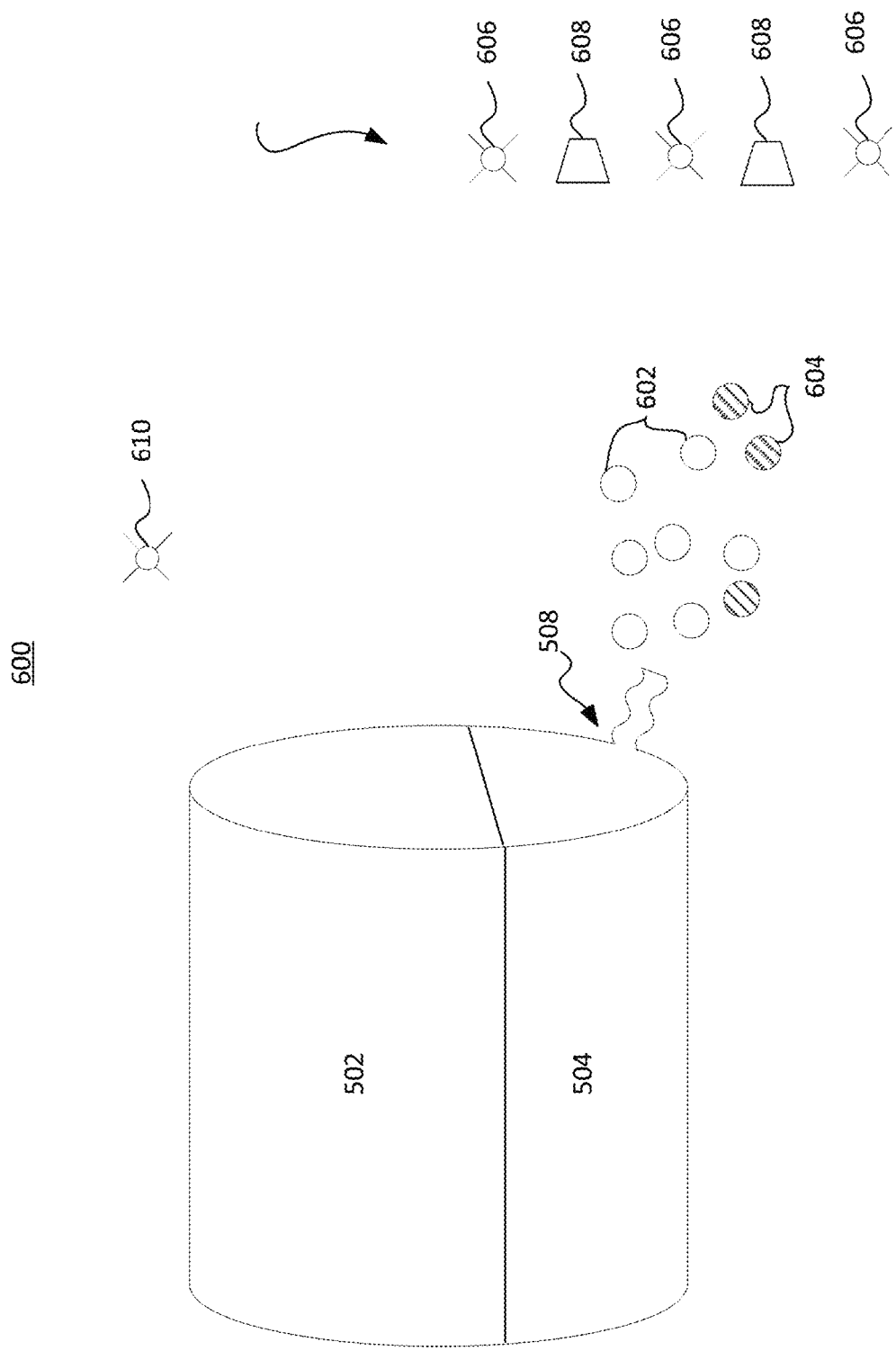
FIG. 6 is a cross sectional view of a fuel tank releasing fuel into a field of view of a vision system exterior thereto, according to an embodiment.

Referring now to FIG. 6, a cross sectional view of a system 600 including a fuel tank 500 is provided, the fuel tank 500 including components of a vision system 302 exterior thereto. The vision system 302 can include one or more sensors 608 such as cameras or various time of flight sensors described herein. The sensors 608 can detect reflected signals projected from one or more emitters 606 of the vision system 302, or one or more ambient emitters 610 such as solar radiation, traffic lights, oncoming headlights, and so forth. In some embodiments, a fuel release can be associated with a thermal event, such that the released fuel can detect light emitted therefrom. A reflectivity profile 324 can detect such a condition based on an intensity or frequency of such a thermal event (e.g., burning fuel). The detected frequency or intensity can be indicative of one or more fluid types, such as a fuel, oil, or so forth. The sensor 608 can be communicatively coupled with a fuel shut off valve, fire suppression systems, or other vehicle components. The fuel tank 500 can include the second breach 508 depicted in FIG. 5. The fuel can exit from the breach, to form fuel droplets 602 or other discharge from the fuel tank 500, which may vary according to a geometry, size, or position of the second breach 508. Water droplets 604 formed from ambient conditions, such as rain or tire spray may be present. The fuel droplets 602 and water droplets 604 can exist at a same time, or the vision system 302 can otherwise distinguish between the fuel droplets 602 and water droplets 604. The water droplets 604 can vary in composition, such as to include various oils discharged from vehicles traversing the roadway. Further, the vision system 302 can be configured to detect a release of various fluids, such as coolant or motor oil, along with the fuel of the current illustrative example. Thus, it may be challenging to classify a flow rate, fluid type, or other information associated with a fluid release such as the depicted fuel release.

The vision system 302 can include any number of emitters 606 corresponding to any number of sensors 608. For example, the vision system 302 can include a red light emitter 606 and an infrared light emitter 606 which are both detectable by a same camera, or a wide spectrum LED which is detectable, in different components, from different cameras. Likewise, radar, LiDar, or ultrasonic sensors 608 and emitters can include various combinations of pairings, such as 1:1, 1:N, N:N, and N:1.

The emitters 606 can provide a steady state output or can provide a time-variable output, such as an oscillating output, pulse-width modulated (PWM) output, or so forth. Such a time-variable output can be performed in coordination with the one or more sensors 608 such that the sensors 608 can selectively detect a reflectivity profile 324 associated with each of the sensor types or combinations thereof. The emitters 606 can provide a same signal type, such that an intensity is varied according to a number of emitters 606 active during a time interval. The emitters 606 can provide a same or different type of signal. For example, the emitters 606 may operate at a different frequency, such that the vision system 302 can determine a frequency response of the reflectivity profile 324 of the fluid. The emitters 606 can provide a same or different carrier type. For example, the emitters can include LiDAR, radar, ultrasonics, lasers, etc., such that the vision system 302 can determine a response of the reflectivity profile 324 with regard to various carrier types. In some embodiments, the rate of a time variable output can be selected to exceed human perception (e.g., 500 Hz, 1 KHz, etc.), such that flickering is not perceptible to human drivers sharing a roadway with the autonomous vehicle 102.

Figure 7:
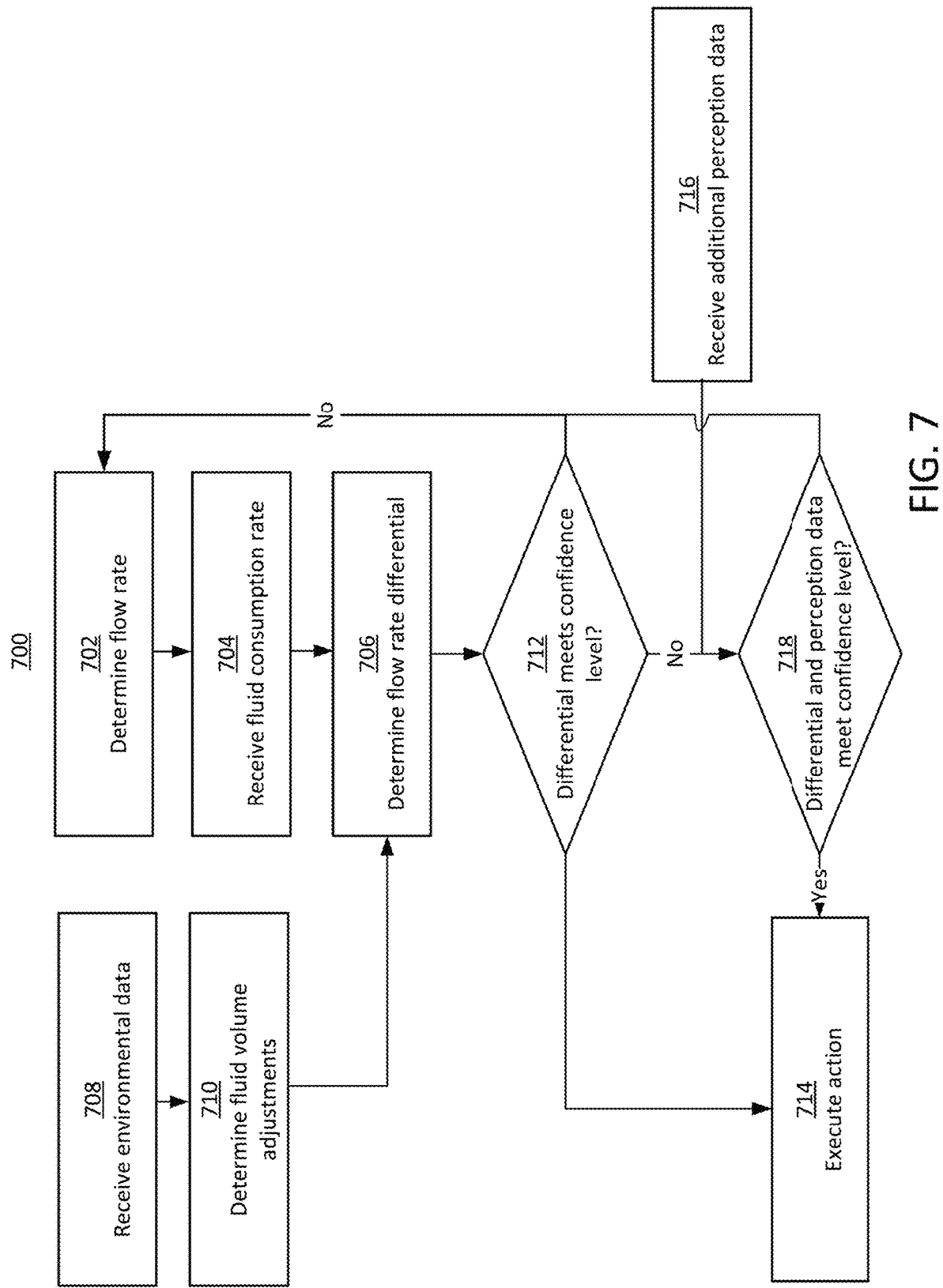
FIG. 7 is a flow diagram of an example method of determining a fluid release from a vehicle, according to an embodiment.

FIG. 7 is a flow diagram of an example method 700 of determining a fluid release from an autonomous vehicle 102, according to an embodiment. The method may be performed by one or more devices or elements of FIG. 1, 2, 3, 5, or 6, such as an autonomous vehicle 102, server 122, or another data processing system 300, including one or more processors. It is noted that the method 700 is merely an example, and is not intended to limit the present disclosure. Accordingly, it is understood that additional operations may be provided before, during, and after the method 700 of FIG. 7, and that some other operations may only be briefly described herein.

In brief overview, the method 700 includes operation 702 of determining a flow rate of a fluid. The method 700 includes operation 704, of receiving a fluid consumption rate. The method 700 includes operation 706, of determining a flow rate differential. The method 700 includes operation 708, of receiving environmental data. The method 700 includes operation 710, of determining fluid volume adjustments. The method 700 includes operation 712, of determining whether a flow rate differential meets a confidence level. The method 700 includes operation 714, of executing an action. The method 700 includes operation 716, of receiving data from a perception system. The method 700 includes operation 718, of determining whether the combination of the perception data and differential flow rate meet the confidence level.

Referring again to operation 702, the method 700 includes determining a flow rate of a fluid, such as a headspace gas of a fluid reservoir 306. The flow rate can be determined according to various sensor data. For example, the flow rate can be determined from a mass flow sensor indicative of the flow rate. In some embodiments, the mass flow rate indicated by the mass flow sensor can be smoothed, averaged, or otherwise processed to determine a flow rate over a period of time. In some embodiments, a mass flow sensor can indicate a momentary indication of a flow rate. In some embodiments, the flow rate can be determined by various sensors such as a mass flow sensor in combination with a pressure sensor, bypass valve, or other devices communicatively coupled to a same one or more processors. For example, the sensor can be disposed in series with, integral to, or separate from a reservoir vent such as a fuel vapor vent, thermostat, or so forth. In some embodiments, the sensor data is compared to one or more states, such as a state of a bypass valve or fuel cap. For example, the flow data for a fuel tank 500 may be valid upon an application of a fuel cap and invalid if a fuel cap is unsecured. In some embodiments, a determination of a flow rate can be zero (e.g., based on a closed valve).

In some embodiments, the flow rate can be determined from pressure measurements. A measurement of the pressure of a fuel tank 500 can include a first indication of pressure at a first position, and a second indication of pressure at a second position (e.g., differential pressure sensors) or a time-series measurement. Based on a pressure differential or gradient, the pressure system 304 can determine a flow rate. Such illusory examples are not intended to be limiting. In various embodiments, the pressure system 304 can employ ultrasonics to detect air velocity through a feature having a known geometry, and determine a flow rate based on the velocity, a pressure differential of a pilot tube, or other indications of flow rates. A flow rate may be determined for multiple fluid reservoirs 306 or individually for various fluid reservoirs 306.

Referring again to operation 704, the method 700 includes receiving a fluid consumption rate. The fluid consumption rate can include a consumption of a fuel which is combusted. The fluid consumption rate can include or another fluid which evaporates, degrades, leaks, or is sprayed (e.g., washer fluid) from an autonomous vehicle 102. The fluid consumption rate can include a fluid which is withdrawn from a fluid reservoir 306 prior to a return thereof (e.g., oil from an oil pan, coolant from a radiator, or so forth). The fluid consumption rate can be a predefined fuel consumption rate based on a vehicle or vehicle type. For example, the fluid consumption rate for fuel can refer to a rate which exceeds the vehicles ability to combust during normal operation (e.g., according to a limit of a vehicle control module 206, fuel pump, or so forth). The fluid consumption rate can vary according to vehicle operation. Continuing the example of fuel, the fluid consumption rate can be based on a fuel flow rate of fuel trim rate received from the vehicle control module 206, or derived therefrom (e.g., based on a fixed offset such as 0.2 liters per minute, a percent deviation, a time average, or so forth). The fluid consumption rate can be a total fluid consumption rate of an autonomous vehicle 102, or a portion thereof associated with a fluid reservoir 306 of a plurality of fluid reservoirs 306. For example, the autonomous vehicle 102 can include left and right fuel tanks 500, and can draw fuel from one or both of them, such as according to a valve, pressure, differential, or other intermediary controlled, monitored, or inferred by the vehicle control module 206.

Referring again to operation 706, the method 700 includes determining a flow rate differential between the flow rate of the first fluid (e.g., the headspace gas), and the second fluid (e.g., fuel). The differential can be determined by subtracting a volumetric flow rate of the first or second fluid from the volumetric flow rate of the second or first fluid. For example, a fluid volume can determinized from a fixed lookup value from a mass or other indication. A density of diesel or air can vary with temperature or pressure (e.g., elevation or pressurization of a reservoir). Such variation can be obviated by selecting a threshold for a comparison, but may lead to non-detection or delayed detection of low volume releases. In some embodiments, a volume of one or more fluids (e.g., the air and not the diesel) can be adjusted based on environmental conditions as is described with regard to operations 708 and 710 of the present method 700.

Referring again to operation 708, the method 700 includes receiving environmental data. The environmental data can include information indicative of pressure (e.g., elevation as received from a GNSS receiver 208) or temperature (e.g., a sensor of the vehicle control module 206 such as an intake air temperature or a separate sensor of the autonomous vehicle 102 to detect ambient air). At operation 710, the fluid volume can be determined based on the environmental data and the mass or other indication of the fluid, such as according to a lookup table or function.

Referring again to operation 712, the method 700 includes determining whether the differential meets a confidence level. Responsive to a determination that the differential meets a confidence level, the method 700 can proceed to operation 714. Responsive to a determination that the differential does not meet a confidence level, the method 700 can proceed to operation 718. The determination can be based on a magnitude of a difference between a fluid consumption rate and a determined flow rate, or a time period that a differential is maintained. In some embodiments, the differential can exceed a confidence interval for a first action, any may proceed to operation 714 with regard to such an action (e.g., lane changes, speed reductions, conveyances of information), and may proceed to operation 718 with regard to other actions (e.g., halting a vehicle or exiting a roadway).

Referring again to operation 714, the method 700 includes execution of an action, such as a navigational or non-navigational action. For example, the action can be an action determined from an action LUT 326, such as a predefined action or function based action thereof. The action can be executed by an autonomy system 114 of the autonomous vehicle 102 which may cause the autonomy system 114 to execute the action based on further information received from a perception system thereof. The action can include the various navigational or non-navigational actions described herein, variants thereof, or the like. The action can be based on an output of the response filter 312. For example, an indication, by the response filter 312 can indicate that the action taken should be a navigational action (e.g., exiting the roadway). Another indication, by the response filter 312 can suppress the detection, such that no action is taken, or cause another action such as a logging or conveyance of information, or storing an indication of a potential fuel release such that a data processing system 300 can, upon a subsequent indication (e.g., a fuel gauge indication) determine a fuel release event has occurred.

At operation 716, the method 700 receive additional perception data. The perception data can include detection of FOD along a roadway, auditory indications of impacts or punctures, or visible indications of spillage. Based on the additional perception data, in combination with the differential, the method 700 can include determining whether the combination of the data exceeds the confidence level at operation 718 (e.g., determining whether the combination of the perception data and differential flow rate meet the confidence level), which can include an adjustment of a confidence interval based on an offset, vote, or ingestion of further information into a prediction model.

Figure 8:
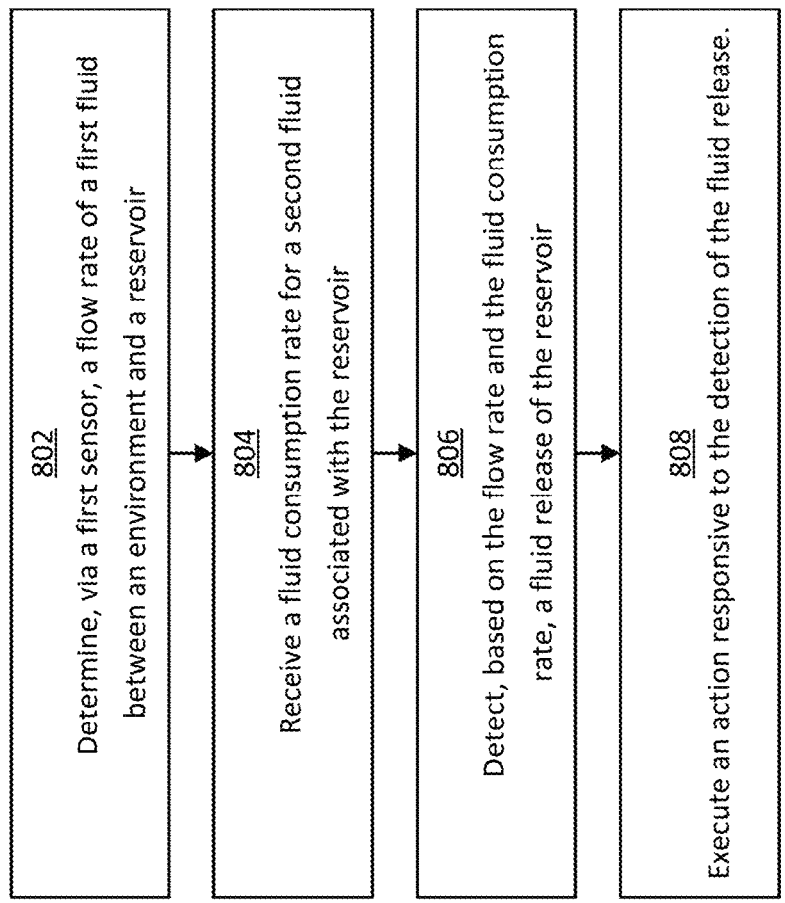
FIG. 8 is a flow diagram of another example method of determining a fluid release from a vehicle, according to an embodiment.

FIG. 8 is a flow diagram of another example method 800 of determining a fluid release from an autonomous vehicle 102, according to an embodiment. The method may be performed by one or more devices or elements of FIG. 1, 2, 3, 5, or 6, such as an autonomous vehicle 102, server 122, or another data processing system 300, including one or more processors. It is noted that the method 800 is merely an example, and is not intended to limit the present disclosure. Accordingly, it is understood that additional operations may be provided before, during, and after the method 800 of FIG. 8, and that some other operations may only be briefly described herein.

The method 800 includes operation 802, of determining, via a first sensor, a flow rate of a first fluid between an environment and a reservoir. The method 800 includes operation 804, of receiving a fluid consumption rate for a second fluid associated with the reservoir. The method 800 includes operation 806, of detecting a fluid release of the reservoir, based on the flow rate and the fluid consumption rate. The method 800 includes operation 808, of executing an action responsive to the detection of the fluid release.

Figure 9:
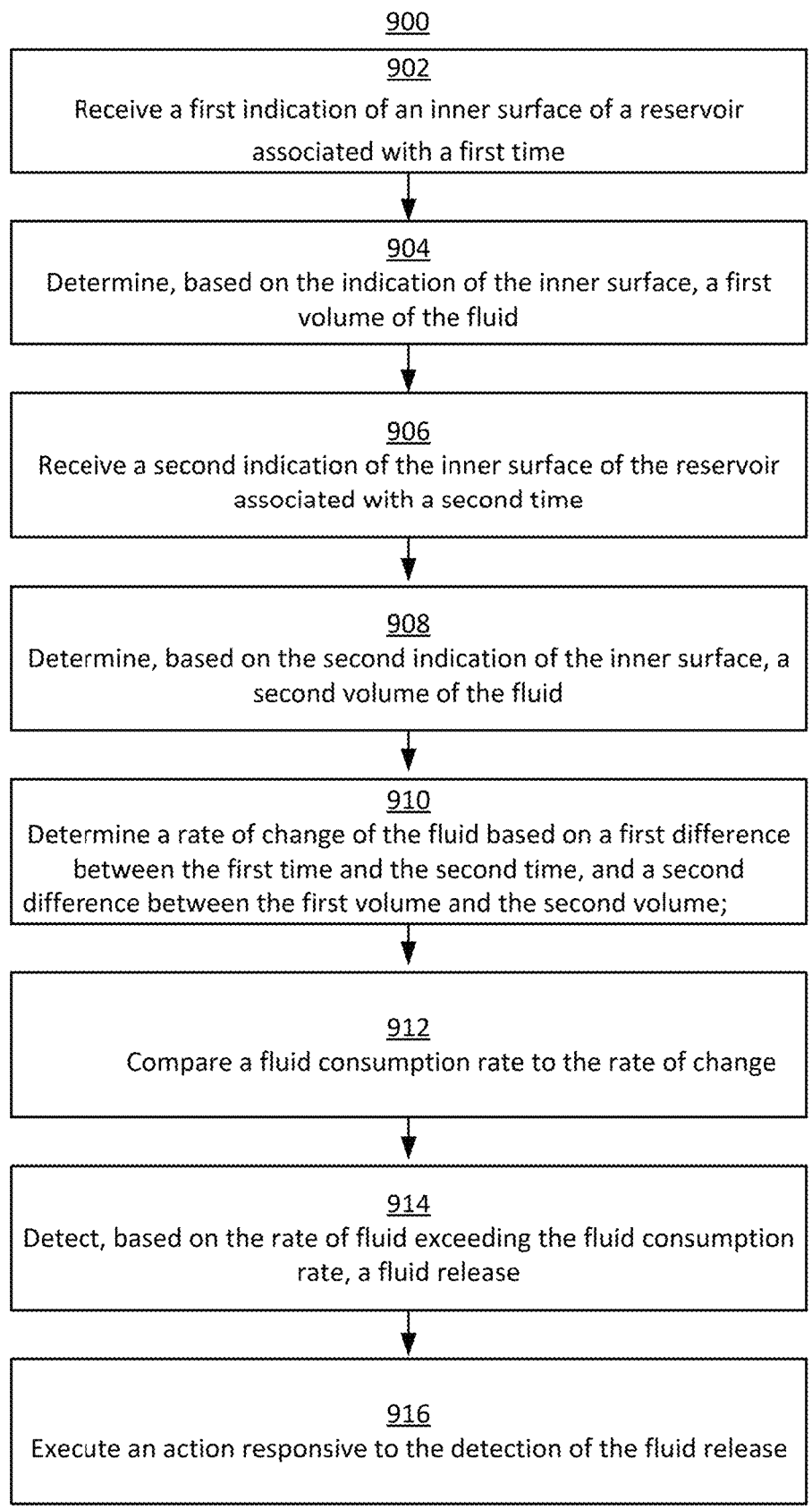
FIG. 9 is a flow diagram of yet another example method of determining a fluid release from a vehicle, according to an embodiment.

FIG. 9 is a flow diagram of yet another example method of determining a fluid release from an autonomous vehicle 102, according to an embodiment. The method 900 may be performed by one or more devices or elements of FIG. 1, 2, 3, 5, or 6, such as an autonomous vehicle 102, server 122, or another data processing system 300, including one or more processors. It is noted that the method 900 is merely an example, and is not intended to limit the present disclosure. Accordingly, it is understood that additional operations may be provided before, during, and after the method 900 of FIG. 9, and that some other operations may only be briefly described herein.

In brief overview, the method 900 includes operation 902, of receiving a first indication of an inner surface 410 of a reservoir associated with a first time. The method 900 includes operation 904, of determining a first volume of the fluid. The method 900 includes operation 906, of receiving a second indication of the inner surface 410 of the reservoir associated with a second time. The method 900 includes operation 908, of determining a second volume of the fluid. The method 900 includes operation 910, of determining a rate of change of the fluid based on a first difference between the first time and the second time, and a second difference between the first volume and the second volume. The method 900 includes operation 912, of comparing fluid consumption rate to the rate of change. The method 900 includes operation 914, of detecting a fluid release. The method 900 includes operation 916, of executing an action responsive to the detection of the fluid release.

Referring again to operation 902, the method 900 includes receiving a first indication of an inner surface 410 of a reservoir associated with a first time. The indication can refer to a visual indication of a fluid level line 402 intermediating a headspace-reservoir junction from a fuel-reservoir junction. For example, the indication can refer to a detection of an outline of the fuel. The indication can refer to a number, dimension (e.g., length) portion, or type of marking which is visible, which may be indicative of a marking which is not under a fluid level line 402. The indication can refer to an intensity (e.g., attenuation thereof), scattering, frequency, or the like of one or more signals conveyed from one or more emitters to an inner surface 410 of the reservoir (e.g., a marking thereupon), a surface of the fluid, or the like. The received indication can be a reflected signal of visible spectrum light, infrared light, radar, ultrasonics, or so forth. The indication can be or include a time average, smoothed, or other processed indication.

Referring again to operation 904, the method 900 includes determining a first volume of the fluid. The volume of the fluid can be determined based on a reservoir profile 322 including marking positions, fluid depths, or so forth, in combination with a reservoir profile 322. For example, a geometry of the fluid in the fluid reservoir 306 can be determined, or a look up value based on the indication received at operation 902. The volume can be or include a time average, smoothed, or other processed volume.

Referring again to operation 906, the method 900 includes receiving a second indication of the inner surface 410 of the reservoir associated with a second time. In some embodiments, the first and second time can be periodic, responsive to an event, or continual (e.g., information can be continuously provided to a circular buffer whereupon the one or more processors can determine a deface between two portions of the circular buffer). In some embodiments, a confidence may depend on a distance in time. For example, for a volume change across 3 seconds confidence can be less than a similar magnitude of change or rate of change across 10 second. Referring again to operation 908, the method 900 includes determining a second volume of the fluid, based on the second indication of operation 906.

Referring again to operation 910, the method 900 includes determining a rate of change of the fluid based on a first difference between the first time and the second time, and a second difference between the first volume and the second volume. Referring again to operation 912, the method 900 includes comparing a fluid consumption rate to the rate of change. The fluid consumption rate can include a fluid consumption rate determined or received as described herein, such as described with reference to operation 704 of FIG. 7.

Referring again to operation 914, the method 900 includes detecting a fluid release. The detection of the fluid release can be based on a rate of change exceeding a threshold, such as a fixed threshold, or a threshold based on a measurement of a rate of fluid consumption as is described with, for example, operations 712, 716, and 718 of FIG. 7.

Referring again to operation 916, the method 900 includes executing an action responsive to the detection of the fluid release. The execution of the action can include an action executed as described herein, such as with reference to operation 714 of FIG. 7.

Figure 10:
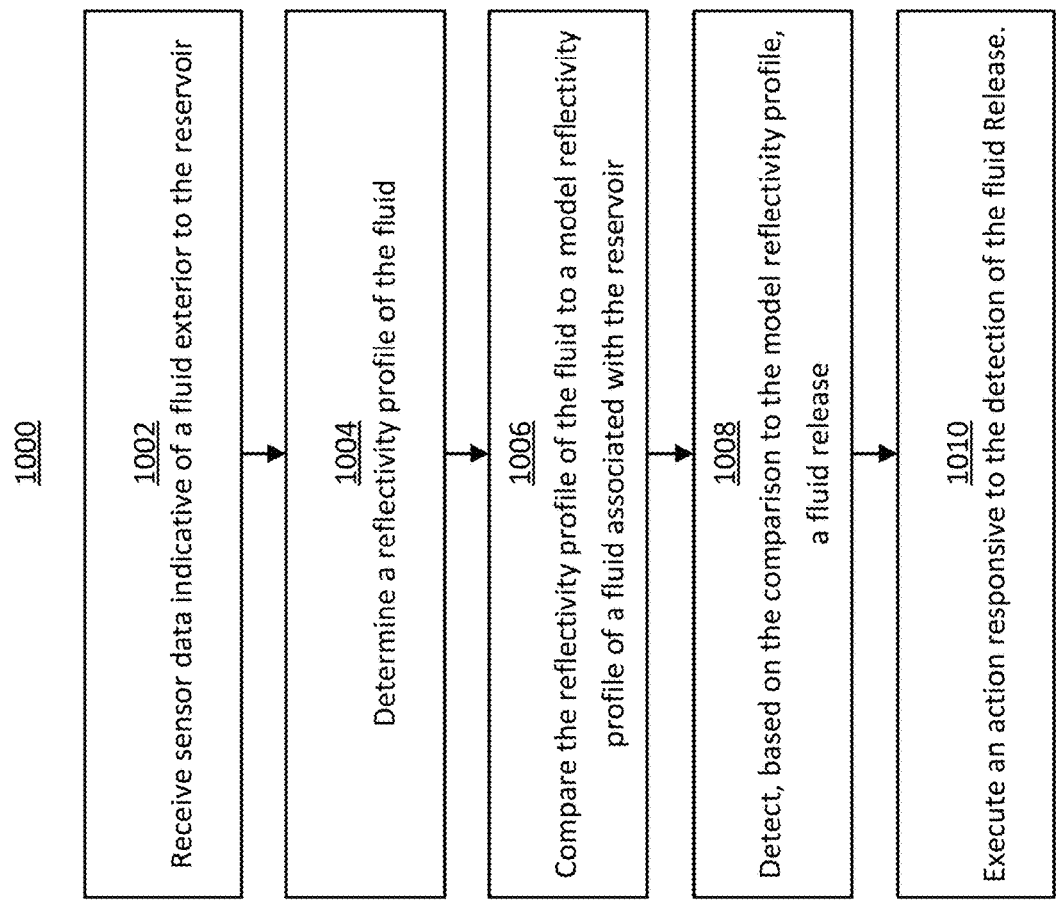
FIG. 10 is a flow diagram of a further example method of determining a fluid release from a vehicle, according to an embodiment.

FIG. 10 is a flow diagram of an example method 1000 of determining a fluid release from the autonomous vehicle 102, according to an embodiment. The method 1000 may be performed by one or more devices or elements of FIG. 1, 2, 3, 5, or 6, such as an autonomous vehicle 102, server 122, or another data processing system 300, including one or more processors. It is noted that the method 1000 is merely an example, and is not intended to limit the present disclosure. Accordingly, it is understood that additional operations may be provided before, during, and after the method 1000 of FIG. 10, and that some other operations may only be briefly described herein.

In brief overview, the method 1000 includes operation 1002, of receiving sensor data indicative of fluid. The method 1000 includes operation 1004, of determining a reflectivity profile 324 of a fluid exterior to the reservoir. The method 1000 includes operation 1006, of comparing the reflectivity profile 324 of the fluid to a reflectivity profile 324 of a fluid associated with a reservoir.

Referring again to operation 1002, the method 1000 can include a receipt of sensor data, such as signals reflected from an ambient source or an emitter communicatively coupled to the one or more processors. The sensor data can include one or more images, video, reflectivity brightness levels (for a carrier type, frequency, spatial dimension), and so forth. The sensor data can vary according to one or more frequencies, carrier types, and the like (e.g., light, ultrasonics, or radar). The sensor data can include temporal elements such as droplets captured in a time-sequence of images. The sensor data can include information associated with different emitters based on an emission pattern. For example, the emission pattern can be mutually exclusive between emitters (e.g., to isolate a response to different frequencies or carrier types), or include a cumulative number of emitters (e.g., to determine a response to various intensities). For example, the sensor data can be reflected from emitters controlled by the one or more processors to convey a first portion of the signal at a first frequency and a second portion of the signal at a second frequency, at a same or different time than the first frequency.

Referring again to operation 1004, the method 1000 can include determining a reflectivity profile 324 of the fluid. The reflectivity profile 324 can be based on a total intensity, or an intensity at one or more frequencies. The reflectivity profile 324 can be based on temporal elements such as a direction of travel (e.g., according to an optical flow model) of droplets, such as to distinguish from a hydrocarbon fuel, raindrops, and tire spray. The model can include various discrete datapoints, or exist in a hidden layer of a model such as convolutional network.

Referring again to operation 1006, the method 1000 can include comparing the reflectivity profile 324 to a model reflectivity profile 324 of a fluid associated with a fluid reservoir 306. The determination may be based on a machine learning model trained to classify reflectivity profiles 324, such as to determine a difference between a reflectivity profile 324 and a model reflectivity profile 324. The determination may be based on a comparison with or one or more thresholds for various attributes of the model having respective weights associated therewith. The comparison can determine a confidence such as a distance, percent change, z-score, or other indication of a comparison between the reflectivity profiles 324 and a model reflectivity profile 324. In some embodiments, the reflectivity profile 324 can be determined with regard to one or more fluids of the autonomous vehicle 102 which are stored in various reservoirs, or environmental fluids such as rain. In some embodiments, the profile may be indicative of two or more fluid types (e.g., rainwater, tire spray of water including oils, and diesel fuel). The comparison may further compare a droplet size, location, or the like to identify a reservoir or other release point (e.g., left or right fuel tank 500, fuel pump connection, or so forth).

Referring again to operation 1008, the method 1000 can include detecting a fluid release based on the comparison. For example, the method can include comparing the difference between an identified profile and a model profile to a threshold, or receiving other vehicle data, such as information from further vision systems 302, pressure systems 304, or vehicle perception systems. The detection can include a detection of a location, quantity, condition or other information of the fluid.

Referring again to operation 1010, the method 1000 includes executing an action responsive to the detection of the fluid release. The execution of the action can include an action executed as described herein, such as with reference to operation 714 of FIG. 7.

Figure 11:
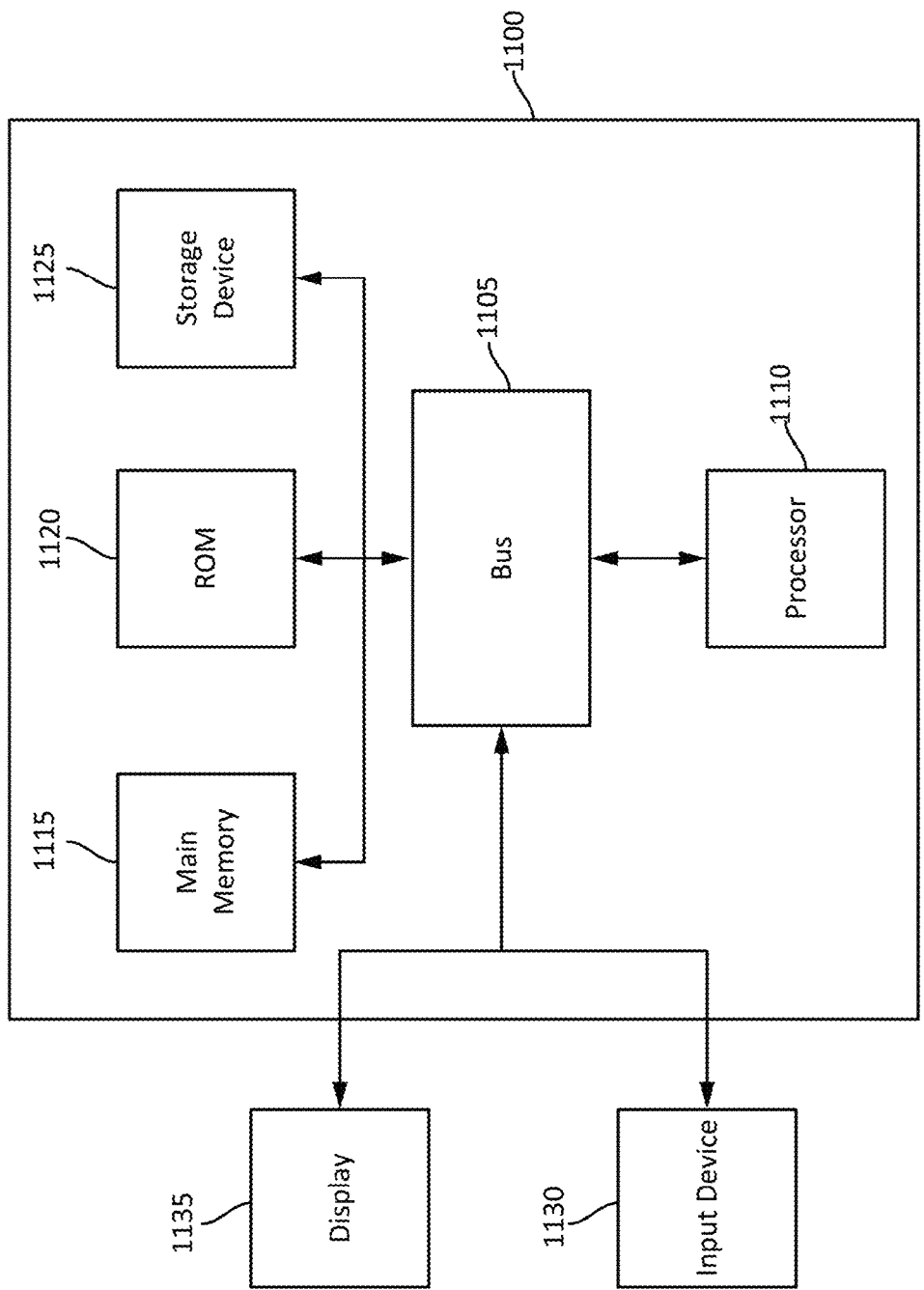
FIG. 11 is a block diagram illustrating an architecture for a computer system that can be employed to implement elements of the systems and methods described and illustrated herein.

FIG. 11 is a block diagram illustrating an architecture for a computer system that can be employed to implement elements of the systems and methods described and illustrated herein, including, for example, the systems depicted in FIGS. 1, 2, 3, 4, 5 and 6, and the methods depicted in FIGS. 7, 8, 9, and 10. The computing system 1100 includes at least one bus 1105 or other communication component for communicating information and at least one processor 1110 or processing circuit coupled to the bus 1105 for processing information. The computing system 1100 can also include one or more processors 1110 or processing circuits coupled to the bus for processing information. The computing system 1100 also includes at least one main memory 1115, such as a random access memory (RAM) or other dynamic storage device, coupled to the bus 1105 for storing information, and instructions to be executed by the processor 1110. The main memory 1115 can be used for storing information during execution of instructions by the processor 1110. The computing system 1100 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 1100 may be coupled via the bus 1105 to a display 1135, such as a liquid crystal display, or active matrix display, for displaying information to a user such as a driver of a vehicle or another end user. An input device 1130, such as a keyboard or voice interface may be coupled to the bus 1105 for communicating information and commands to the processor 1110. The input device 1130 can include a touch screen display 1135. The input device 1130 can also include a cursor control, such as a mouse, a trackball, or cursor direction keys, for communicating direction information and command selections to the processor 1110 and for controlling cursor movement on the display 1135.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Various descriptions, herein, make use of the word "or" to refer to plurality alternative options. Such references are intended to convey an inclusive or. For example, various server 122 components herein can include hardware or software components. Such a disclosure indicates that the components may comprise a hardware component, a software component, or both a hardware and a software component.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A vehicle, comprising:
one or more processors configured to:
receive a first indication of an inner surface of a reservoir associated with a first time;
determine, based on the indication of the inner surface, a first volume of a fluid of the reservoir;
receive a second indication of the inner surface of the reservoir associated with a second time;
determine, based on the second indication of the inner surface, a second volume of the fluid;
determine a rate of change of the fluid based on a first difference between the first time and the second time, and a second difference between the first volume and the second volume;
compare a fluid consumption rate to the rate of change;
detect, based on the rate of change exceeding the fluid consumption rate, a fluid release; and
execute an action responsive to the detection of the fluid release.

2. The vehicle of claim 1, wherein the fluid consumption rate is a predefined maximum fuel consumption of the vehicle.

3. The vehicle of claim 1, wherein the fluid consumption rate is periodically received from a vehicle controller, responsive to vehicle operation.

4. The vehicle of claim 1, wherein the vehicle is configured to detect an indication of foreign objects or debris on a roadway, and determine the fluid release based on the indication.

5. The vehicle of claim 1, wherein the action comprises a navigational action.

6. The vehicle of claim 1, wherein the reservoir includes a vision sensor and a light source, along with reservoir markings configured to interface with the light source, and be received by the vision sensor, the vision sensor comprising an oleo-phobic layer intermediating the vision sensor from the fluid.

7. The vehicle of claim 1, wherein a vision sensor and a light source is an infra-red spectrum emitter, and the reservoir markings have a reflectivity profile peaking in an infrared range.

8. The vehicle of claim 1, wherein a vision sensor is configured to detect a fluid depth based on a scattering or attenuation of light emitted by a light source.

9. The vehicle of claim 1, wherein a vision sensor is configured to determine the first volume or the second volume based on edge detection of a fluid line intermediating a headspace-reservoir junction from a fuel-reservoir junction.

10. A method, comprising:
receiving, by one or more processors, a first indication of an inner surface of a reservoir associated with a first time;
determining, by the one or more processors, based on the indication of the inner surface, a first volume of a fluid of the reservoir;
receiving, by the one or more processors, a second indication of the inner surface of the reservoir associated with a second time;
determining, by the one or more processors, based on the second indication of the inner surface, a second volume of the fluid;
determining, by the one or more processors, a rate of change of the fluid based on a first difference between the first time and the second time, and a second difference between the first volume and the second volume;
comparing, by the one or more processors, a fluid consumption rate to the rate of change;
detecting, by the one or more processors, based on the rate of change exceeding the fluid consumption rate, a fluid release; and
executing, by the one or more processors, an action responsive to the detection of the fluid release.

11. The method of claim 10, wherein the fluid consumption rate is periodically received from a vehicle controller, responsive to vehicle operation.

12. The method of claim 10, wherein the action comprises a navigational action for an autonomous vehicle.

13. The method of claim 10, wherein the reservoir includes a vision sensor and a light source, along with reservoir markings configured to interface with the light source, and be received by the vision sensor, the vision sensor comprising an oleo-phobic layer intermediating the vision sensor from the fluid.

14. The method of claim 10, wherein a vision sensor and a light source is an infra-red spectrum emitter, and the reservoir markings have a reflectivity profile peaking in an infrared range.

15. The method of claim 10, wherein a vision sensor is configured to detect a fluid depth based on a scattering or attenuation of light emitted by a light source.

16. The method of claim 10, wherein a vision sensor is configured to determine the first volume or the second volume based on edge detection of a fluid line intermediating a headspace-reservoir junction from a fuel-reservoir junction.

17. A system, comprising one or more processors configured to:
receive a first indication of an inner surface of a reservoir associated with a first time;
determine, based on the indication of the inner surface, a first volume of a fluid of the reservoir;
receive a second indication of the inner surface of the reservoir associated with a second time;
determine, based on the second indication of the inner surface, a second volume of the fluid;
determine a rate of change of the fluid based on a first difference between the first time and the second time, and a second difference between the first volume and the second volume;
compare a fluid consumption rate to the rate of change;
detect, based on the rate of change exceeding the fluid consumption rate, a fluid release; and
execute an action responsive to the detection of the fluid release.

18. The system of claim 17, wherein the fluid consumption rate is periodically received from a vehicle controller, responsive to vehicle operation.

19. The system of claim 17, wherein the reservoir includes a sensor comprising an oleo-phobic layer intermediating the sensor from the fluid.

20. The system of claim 17, wherein a vision sensor is configured to detect a fluid depth based on a scattering or attenuation of light emitted by a light source.

* * * * *